United States Patent
Liu

(10) Patent No.: US 12,427,415 B2
(45) Date of Patent: Sep. 30, 2025

(54) IMAGE DISPLAY METHOD AND APPARATUS, DEVICE AND STORAGE MEDIUM

(71) Applicant: Tencent Technology (Shenzhen) Company Limited, Guangdong (CN)

(72) Inventor: Zhihong Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 338 days.

(21) Appl. No.: 17/984,816

(22) Filed: Nov. 10, 2022

(65) Prior Publication Data

US 2023/0124014 A1    Apr. 20, 2023

Related U.S. Application Data

(63) Continuation of application No. PCT/CN2021/123742, filed on Oct. 14, 2021.

(30) Foreign Application Priority Data

Nov. 6, 2020    (CN) ..................... 202011227647.X

(51) Int. Cl.
*A63F 13/537*    (2014.01)
*A63F 13/45*    (2014.01)
(Continued)

(52) U.S. Cl.
CPC ............ *A63F 13/537* (2014.09); *A63F 13/45* (2014.09); *A63F 13/46* (2014.09); *A63F 13/573* (2014.09); *A63F 13/837* (2014.09); *A63F 13/847* (2014.09)

(58) Field of Classification Search
CPC ...... A63F 13/537; A63F 13/837; A63F 13/46; A63F 13/573; A63F 13/847; A63F 13/45
See application file for complete search history.

(56) References Cited

U.S. PATENT DOCUMENTS 6,336,861 B1    1/2002    Konoe et al.
9,399,166 B1 *    7/2016    Haskell ................. A63F 13/537
(Continued)

FOREIGN PATENT DOCUMENTS

| CN | 101518087 A | 8/2009 |
| CN | 102132562 A | 7/2011 |

(Continued)

OTHER PUBLICATIONS

Call of Duty: Modern Warfare 2. Wikipedia.org. Online. 2009. Accessed via the Internet. Accessed Dec. 12, 2024. <URL: https://en.wikipedia.org/wiki/Call_of_Duty:_Modern_Warfare_2> (Year: 2009).*

(Continued)

*Primary Examiner* — Carl V Larsen
(74) *Attorney, Agent, or Firm* — Crowell & Moring LLP

(57) ABSTRACT

An image display method and apparatus, a device and a storage medium can improve a graphical user interface display presented to a user of gameplay information, and improve efficiency of human-computer interaction. An image of a controlled object, belonging to a first team, is displayed. The virtual object is controlled to attack a body part of a target object belonging to a second team. Whether the attack and the attacked body part of the target object meet a condition is determined. When the reward condition is met, a reward is provided to the first team.

20 Claims, 15 Drawing Sheets

(51) Int. Cl.
*A63F 13/46* (2014.01)
*A63F 13/573* (2014.01)
*A63F 13/837* (2014.01)
*A63F 13/847* (2014.01)

(56) References Cited

U.S. PATENT DOCUMENTS

| | | | |
|---|---|---|---|
| 9,922,680 B2 | 3/2018 | Malamal Vadakital et al. | |
| 2005/0170888 A1* | 8/2005 | Sakamoto | A63F 13/58 463/31 |
| 2010/0009734 A1* | 1/2010 | Sambongi | A63F 13/422 463/5 |
| 2010/0153395 A1 | 6/2010 | Hannuksela et al. | |
| 2011/0098094 A1* | 4/2011 | Forsell | A63B 69/02 463/8 |
| 2012/0315997 A1* | 12/2012 | Deal | A63F 13/837 463/43 |
| 2013/0165194 A1* | 6/2013 | Nojiri | A63F 13/10 463/5 |
| 2014/0213358 A1* | 7/2014 | McCarthy | A63F 13/533 463/31 |
| 2014/0367918 A1* | 12/2014 | Mason | F41J 5/14 273/371 |
| 2016/0158623 A1* | 6/2016 | Morehouse | A63B 69/02 273/148 R |
| 2018/0015375 A1 | 1/2018 | Marino | |
| 2018/0161675 A1* | 6/2018 | Miron | A63F 13/822 |
| 2019/0255416 A1* | 8/2019 | Strickland | A63B 69/02 |
| 2021/0065460 A1* | 3/2021 | Lee | G06F 3/011 |
| 2021/0339147 A1* | 11/2021 | Goldfarb | A63F 13/44 |

FOREIGN PATENT DOCUMENTS

| | | | |
|---|---|---|---|
| CN | 105148520 A | 12/2015 | |
| CN | 106663296 A | 5/2017 | |
| CN | 107534801 A | 1/2018 | |
| CN | 110141852 A | 8/2019 | |
| CN | 110917623 A | 3/2020 | |
| CN | 112221135 A | 1/2021 | |
| JP | 2000-107451 A | 4/2000 | |
| JP | 2008-093309 A | 4/2008 | |
| WO | WO 2008/023328 A2 | 2/2008 | |
| WO | WO 2016/024766 A1 | 2/2016 | |
| WO | WO 2022/095672 A1 | 5/2022 | |

OTHER PUBLICATIONS

Team Deathmatch. callofduty.fandom.com. Online. Oct. 15, 2022. Accessed via the Internet. Accessed Dec. 12, 2024. <URL: https://callofduty.fandom.com/wiki/Team_Deathmatch?oldid=2527764> (Year: 2020).*
Headshots Only. callofduty.fandom.com. Online. Jul. 25, 2013. Accessed via the Internet. Accessed Dec. 12, 2024. <URL: https://callofduty.fandom.com/wiki/Headshots_Only?oldid=1975665> (Year: 2013).*
Double Kill. titanfall2.fandom.com. Online Feb. 17, 2014. Accessed via the Internet. Accessed Dec. 12, 2024. <URL: https://titanfall2.fandom.com/wiki/Double_Kill?oldid=5935> (Year: 2014).*
Hitscan. Wikipedia.org. Online. Sep. 21, 2020. Accessed via the Internet. Accessed Dec. 12, 2022. <URL: https://en.wikipedia.org/w/index.php?title=Hitscan&oldid=979521588> (Year: 2020).*
International Search Report and Written Opinion for priority application No. PCT/CN2021/123742 dated Jan. 14, 2022, with English translation of the International Search Report, 13p.
Search Report and Office Action for corresponding application No. CN202011227647.X dated Oct. 29, 2021, 10p.
Concise Explanation of Relevancy for A16.
Notice of Reasons for Refusal for corresponding Japanese application No. 2023-515832 dated Jan. 4, 2024, 4p, in Japanese language.
English language translation of Notice of Reasons for Refusal for corresponding Japanese application No. 2023-515832 dated Jan. 4, 2024, 4p.

* cited by examiner

IMAGE DISPLAY METHOD AND APPARATUS, DEVICE AND STORAGE MEDIUM

RELATED APPLICATION

This application claims priority as a continuation to PCT/CN2021/123742, filed on Oct. 14, 2021, published as WO2022095672A1, and entitled "SCREEN DISPLAY METHOD AND APPARATUS, DEVICE AND STORAGE MEDIUM" which claims priority to Chinese Patent Application No. 202011227647.X, filed on Nov. 6, 2020 and entitled "SCREEN DISPLAY METHOD AND APPARATUS, DEVICE AND STORAGE MEDIUM," each of which are incorporated herein by reference in their entirety.

FIELD OF THE TECHNOLOGY

This application relates to the field of computer technologies, and specifically, relates to an image display method and apparatus, a device and a storage medium.

BACKGROUND OF THE DISCLOSURE

With the development of multimedia technology and diversification of terminal functions, more and more types of games may be played on a terminal. Shooting games are relatively popular games. During games, players may control virtual objects to fight against virtual objects controlled by other players in a virtual scene. Players may control virtual objects including various virtual weapons to attack virtual objects in other teams.

SUMMARY

Embodiments of this application provide an image display method and apparatus, a device and a storage medium, capable of improving the efficiency of human-computer interaction.

In some embodiments, an image display method is provided, the method including the following steps:
 displaying first prompt information on a view image of a controlled virtual object, the controlled virtual object being a virtual object controlled by a terminal and belonging to a first team, and the first prompt information being used for prompting attack on a target body part of a virtual object in a second team;
 displaying first reward information on the view image of the controlled virtual object when the controlled virtual object attacks the target body part of any virtual object in the second team, and the virtual object is killed by the controlled virtual object, the first reward information being used for prompting the number of virtual rewards obtained by the controlled virtual object; and
 displaying an indicator when the sum of virtual rewards obtained by virtual objects in the first team meets a target number condition.

In some embodiments, an image display apparatus is provided, the apparatus including:
 a first prompt information display module, configured to display first prompt information on the view image of a controlled virtual object, the controlled virtual object being a virtual object controlled by a terminal and belonging to a first team, and the first prompt information being used for prompting attack on a target body part of a virtual object in a second team;
 a first reward information display module, configured to display first reward information on the view image of the controlled virtual object when the controlled virtual object attacks the target body part of any virtual object in the second team, and the virtual object is killed by the controlled virtual object, the first reward information being used for prompting the number of virtual rewards obtained by the controlled virtual object; and
 an indicator display module, configured to display an indicator when the sum of virtual rewards obtained by virtual objects in the first team meets a target number condition.

In some embodiments, a computer device is provided, including one or more processors and one or more memories storing at least one computer program, the at least one computer program being loaded and executed by the one or more processors to implement the foregoing image display method.

In some embodiments, a non-transitory computer-readable storage medium is provided, storing at least one computer program, the computer program being loaded and executed by a processor to implement the image display method.

In some embodiments, a computer program product or computer program is provided, the computer program product or computer program including program code stored in a non-transitory computer-readable storage medium, the processor of a computer device reading the program code from the non-transitory computer-readable storage medium, and the processor executing the program code to execute the above image display method on the computer device.

As described herein, during a game, a terminal may display a visual image of a controlled virtual object that belongs to a first team. The controlled virtual object may be controlled to attack a body part of a target virtual object that belongs to a second team. Whether the attack and the attacked body part of the target virtual object meet a reward condition can be determined. When the reward condition is met, the first team can receive an award. The process can provide an improved graphical user interface display presented to a user of gameplay information.

DESCRIPTION OF EMBODIMENTS

Figure 1:
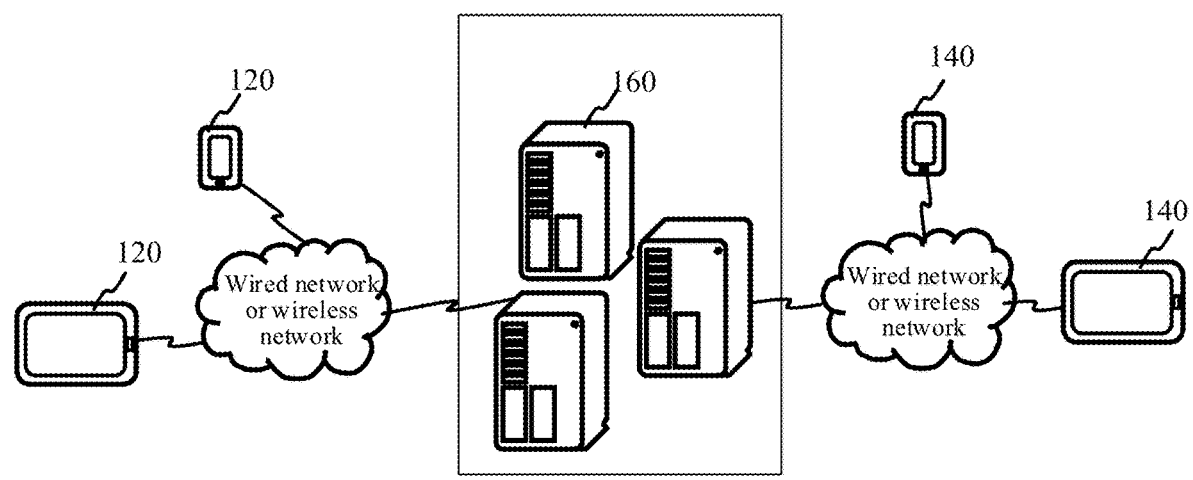
FIG. 1 is a schematic diagram of an example environment for an image display method provided by some embodiments of this application.

The objectives, technical solutions, and advantages of this application are described below with reference to the accompanying drawings.

The terms "first", "second", and the like in this application are used for distinguishing between same items or similar items of which effects and functions are basically the same. The "first", "second", and "nth" do not have a dependency relationship in logic or time sequence, and a quantity and an execution order thereof are not limited.

In this application, "at least one" means one or more, and "a plurality of" means two or more. For example, "a plurality of reference face images" means two or more reference face images.

Virtual scene: It is a virtual scene displayed (or provided) by an application program when run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene. The dimension of the virtual scene is not limited to only those described. For example, the virtual scene may include the sky, the land, the ocean, or the like. The land may include environmental elements such as a desert or a city. The user may control a virtual object to move in the virtual scene.

Virtual object: a movable object in a virtual scene. The movable object may be a virtual character, a virtual animal, a cartoon character, such as characters, animals, plants, oil barrels, walls, stones, etc., displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

In some examples, the virtual object is a player character controlled by operations on a client, or artificial intelligence (AI) set in a fight in a virtual scene by training, or a non-player character (NPC) set in a virtual scene. In some examples, the virtual object is a virtual character who fights in a virtual scene. In some examples, the number of virtual objects participating in an interaction in a virtual scene is preset, or dynamically determined according to the number of clients participating in the interaction.

For example, in a shooting game, a user may control a virtual object to fall freely, glide, parachute, or the like in sky of the virtual scene, or run, jump, crawl, walk in a stooped posture, or the like on land, or may control a virtual object to swim, float, dive, or the like in the ocean. The user may alternatively control a virtual object to ride a virtual vehicle to move in the virtual scene, and for example, the virtual vehicle may be a virtual car, a virtual aircraft, or a virtual yacht. Herein, the descriptions are merely used as examples. Players may also control virtual objects to interact with other virtual objects in a fight mode by means of interactive props. For example, the interactive props may be throwing interactive props such as grenades, cluster grenades and Semtex grenades (referred to as "Semtex"), or interactive shooting props such as machine guns, pistols, and rifles.

FIG. 1 is a schematic diagram of an environment of a method for displaying a virtual scene provided by an embodiment of this application. Referring to FIG. 1, the environment includes: a first terminal 120, a second terminal 140, and a server 160.

An application program supporting virtual scene display is installed and run on the first terminal 120. The application program may be any one of a first-person shooting (FPS) game, a third-person shooting game, a virtual reality application program, a three-dimensional map program, a military simulation program, or a multiplayer gunfight survival game. The first terminal 120 is a terminal used by a first user, and the first user uses the first terminal 120 to operate a controlled virtual object in the virtual scene to perform a movement. The movement includes, but is not limited to, at least one of adjusting body postures, crawling, walking, running, riding, jumping, driving, picking, shooting, attacking, and throwing. For example, the controlled virtual object is a first virtual character such as a simulated character role or a cartoon character role.

The first terminal 120 and the second terminal 140 are connected to the server 160 by using a wireless network or a wired network.

An application program supporting virtual scene display is installed and run on the second terminal 140. The application program may be any one of an FPS game, a third-person shooting game, a virtual reality application program, a three-dimensional map program, a military simulation program, or a multiplayer gunfight survival game. The second terminal 140 is a terminal used by a second user, and the second user uses the second terminal 140 to operate another virtual object in the virtual scene to perform a movement. The movement includes, but is not limited to, at least one of adjusting body postures, crawling, walking, running, riding, jumping, driving, picking, shooting, attacking, and throwing. For example, the virtual object controlled by the second terminal 140 is a second virtual character, such as a simulated person role or a cartoon character role.

The virtual object controlled by the first terminal 120 and the virtual object controlled by the second terminal 140 are in the same virtual scene, and the virtual object controlled by the first terminal 120 may interact with the virtual object controlled by the second terminal 140 in the virtual scene. In some embodiments, the virtual object controlled by the first terminal 120 and the virtual object controlled by the second terminal 140 are in a hostile relationship. For example, the virtual object controlled by the first terminal 120 and the virtual object controlled by the second terminal 140 belong to different teams and organizations, and the virtual objects in a hostile relationship may interact in a fight mode by shooting each other on land.

The application programs installed on the first terminal 120 and the second terminal 140 may be the same, or the application programs installed on the two terminals may be the same type of application programs on different operating system platforms. The first terminal 120 may generally refer to one of a plurality of terminals and the second terminal 140 generally may refer to one of a plurality of terminals. The first terminal 120 and the second terminal 140 are of the same device type or of different device types. The device type includes at least one of a smartphone, a tablet computer, a laptop, and a desktop computer. For example, the first terminal 120 and the second terminal 140 may be smart phones or other hand-held portable game devices. The following embodiment is described by using an example that the terminal is a smartphone.

The server 160 may be an independent physical server, or a server cluster or a distributed system including a plurality of physical servers, or a cloud server for providing basic cloud computing services such as cloud services, cloud databases, cloud computing, cloud functions, cloud storage, network services, cloud communication, middleware services, domain name services, security services, content delivery network (CDN), and big data and artificial intelligence platforms.

Figure 2:
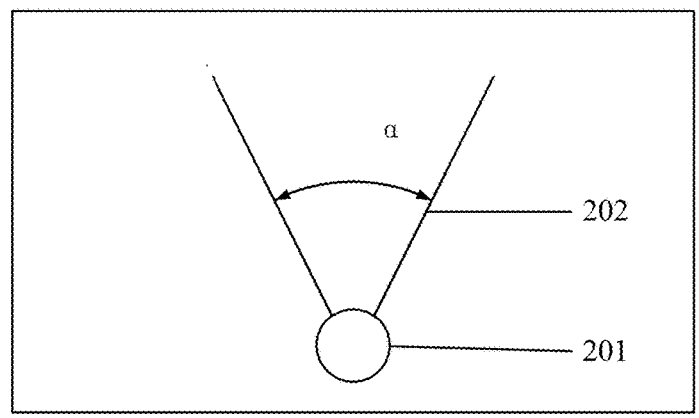
FIG. 2 is a schematic diagram of an example method for acquiring a view image provided by some embodiments of this application.

To describe the technical solutions provided by the embodiments of this application more clearly, firstly, the view image of a controlled virtual object in this application is introduced. Referring to FIG. 2, to make the shooting game more realistic, game designers design the way that the controlled virtual object observes a virtual scene with reference to the way humans observe the real world. The controlled virtual object 201 may observe the virtual scene in an area 202 in the virtual scene, and the image obtained by observing the area 202 from the controlled virtual object 201's angle is the view image of the controlled virtual object. A player may adjust the position of the controlled virtual object 201 observing the virtual scene by adjusting the orientation of the controlled virtual object 201. For the player, the way the controlled virtual object 201 observes the virtual scene is also the way the player observes the virtual scene. The terminal may project the virtual scene in the area 202 onto a screen, so that the player may see what the controlled virtual object 201 sees in the virtual scene on the screen.

Figure 3:
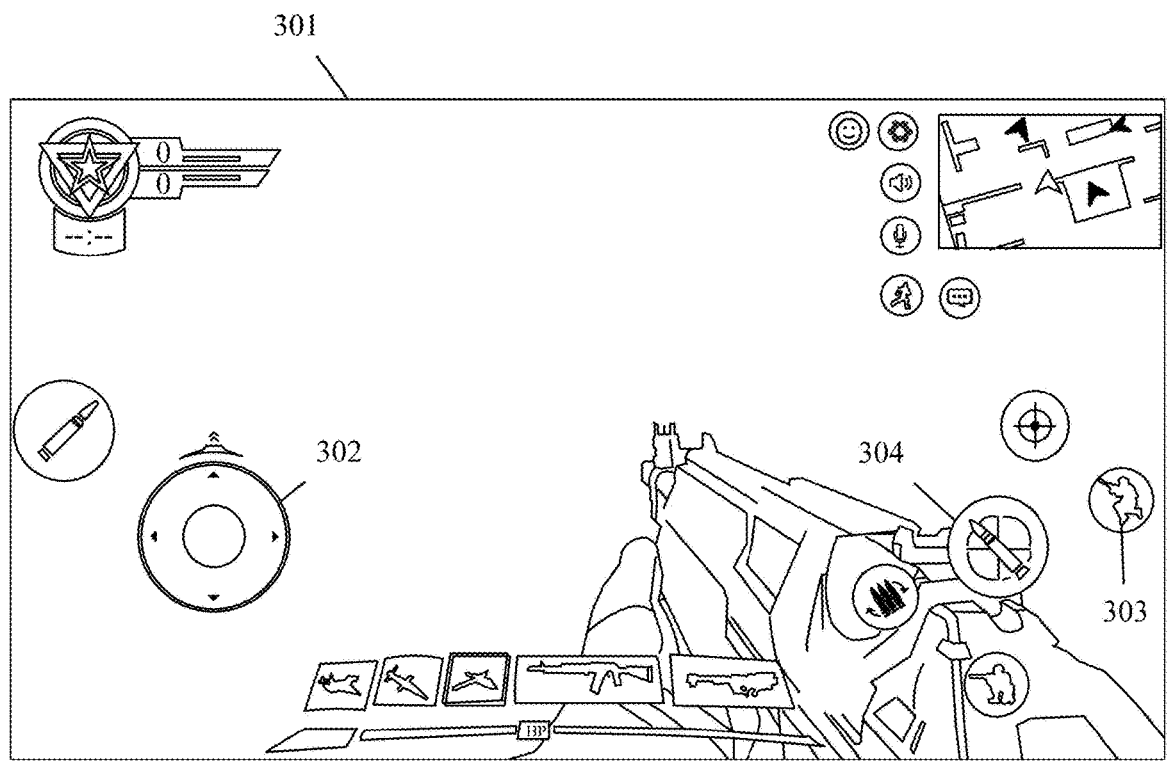
FIG. 3 is a schematic diagram of an example view image provided by some embodiments of this application.

Taking a smart phone as a terminal as an example, controls for controlling the controlled virtual object to perform different actions are also displayed on the view image of a controlled virtual object. Referring to FIG. 3, a control 302, a control 303, and a control 304 are displayed on the view image 301 of a controlled virtual object. The control 302 is used for controlling the moving direction of the controlled virtual object. The control 303 is used for adjusting the posture of the controlled virtual object, for example, to control the virtual object to perform actions such as squatting or crawling. The control 304 is used for controlling an interactive prop held by the controlled virtual object to shoot virtual ammunition.

In some examples, game designers may implement the technical solutions provided by the embodiments of this application as a game mode, and a player may play games based on the technical solutions provided by the embodiments of this application by selecting the game mode.

Figure 4:
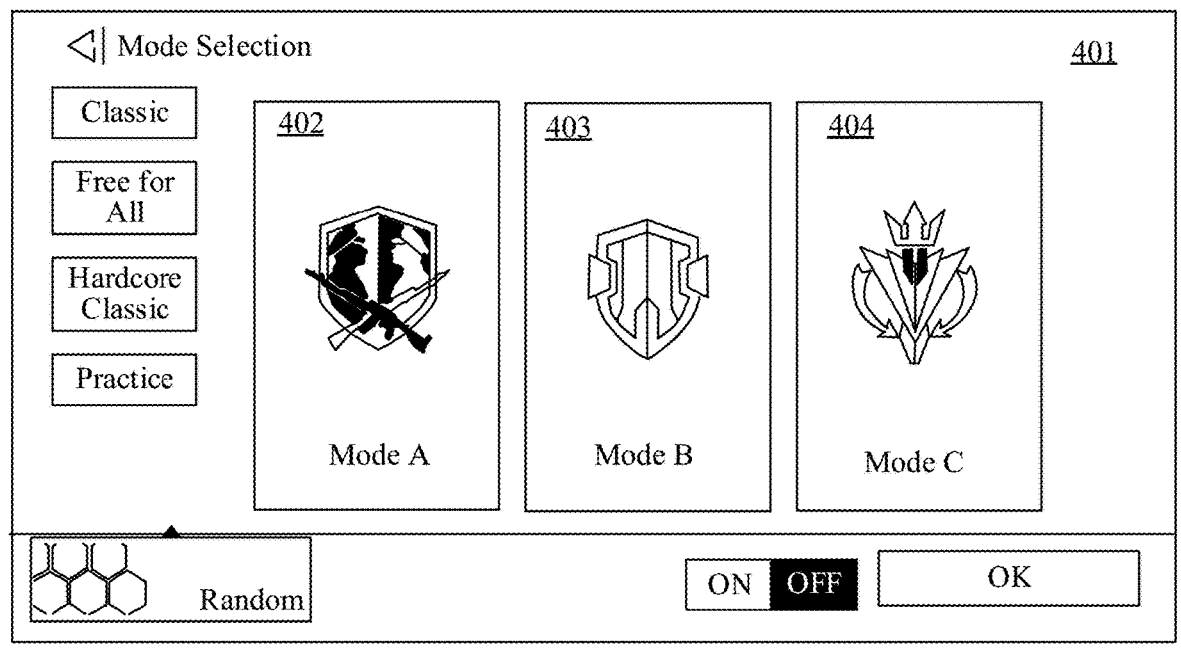
FIG. 4 is a schematic diagram of an example game mode selection interface provided by some embodiments of this application.

For example, referring to FIG. 4, the game application may provide a player with a game mode selection interface 401 before the game starts. The game mode selection interface 401 provides icons 402-404 corresponding to various game modes. The player may select the desired game mode by clicking/tapping the icons 402-404. If game designers set the icon of the game mode corresponding to the embodiments of this application as the icon 403, a player may click/tap the icon 403 to play the game in the mode corresponding to an embodiment of this application.

In the embodiments of this application, a technical method provided by this application may be implemented by interactions between terminals and a server, that is, the terminals are configured to receive operations of players and display data returned by the server, and the server is configured to perform background data processing based on the players' operations, and transmit the processed data to the terminals. In other examples, the technical solutions provided by this application may also be implemented by a terminal as an executive subject.

Figure 5:
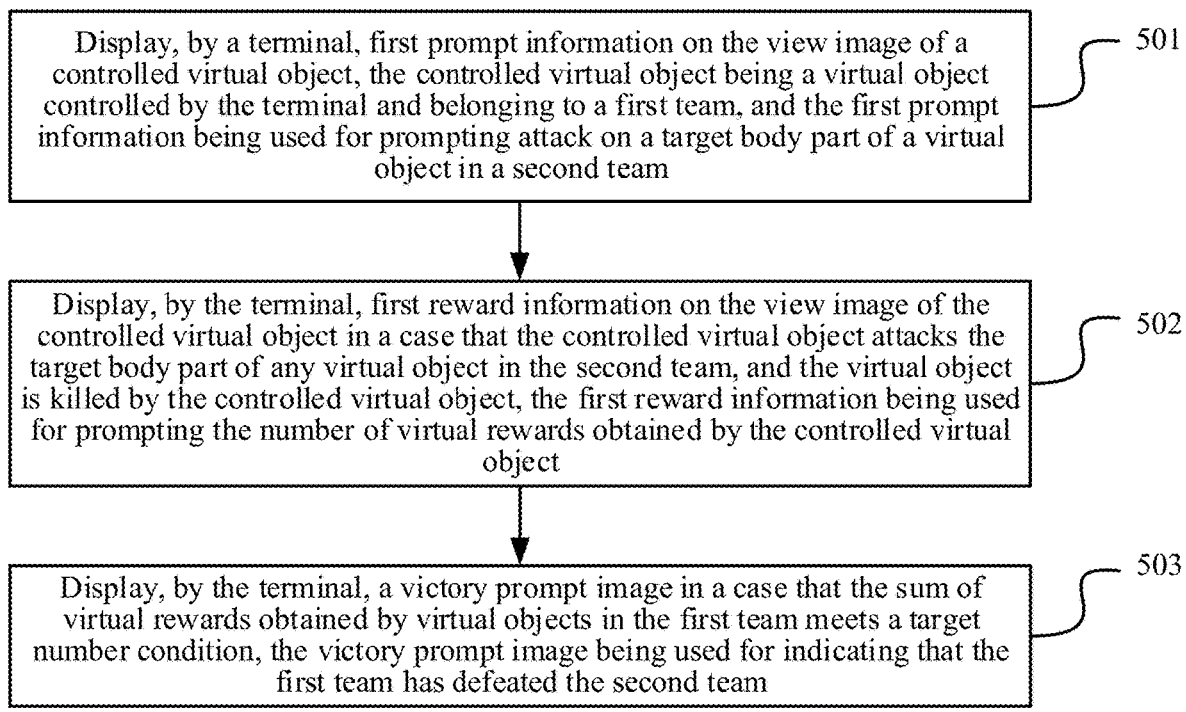
FIG. 5 is a flowchart of an example image display method provided by some embodiments of this application.

FIG. 5 is a flowchart of an image display method provided by an embodiment of this application. Referring to FIG. 5, the method includes the following steps:

Step 501: Display, by a terminal, first prompt information on the view image of a controlled virtual object, the controlled virtual object being a virtual object controlled by the terminal and belonging to a first team, and the first prompt information being used for prompting attack on a target body part of a virtual object in a second team.

The first team and the second team are two hostile teams, and the virtual objects belonging to the first team and the virtual objects belonging to the second team may attack each other in the virtual scene. Attacks include, but are not limited to, shooting virtual ammunition through interactive props, or performing close attacks through virtual knives. The target body part may be a body part determined by the terminal. In some embodiments, the body part is the head of the virtual object, or the hands of the virtual object, or the torso part of the virtual object, or the legs of the virtual object, etc.

Step 502: Display, by the terminal, first reward information on the view image of the controlled virtual object when the controlled virtual object attacks the target body part of any virtual object in the second team, and the virtual object is killed by the controlled virtual object, the first reward information being used for prompting the number of virtual rewards obtained by the controlled virtual object.

The virtual object being killed by another virtual object means that after the virtual object is attacked by another virtual object, the health value of the virtual object decreases to 0. In some embodiments, the hit point is also referred to as "blood volume." In some examples, the virtual reward is a reward such as a virtual prop, a virtual value (e.g., virtual object experience value, and virtual currency), a score in the game, or other game reward.

Step 503: Display, by the terminal, an indicator when the sum of virtual rewards obtained by virtual objects in the first team meets a target number condition.

In some examples, the sum of virtual rewards obtained meeting a target condition means that the sum of virtual rewards obtained is greater than or equal to the target number. The target number may be set by game designers based on a given situation, whether game, game mode, etc. Victory prompt information, e.g., a victory text, or a victory animation, may be displayed in the indicator displayed by the terminal. The victory prompt information indicates that the first team has defeated the second team.

By the technical solutions provided by the embodiments of this application, during a game, a terminal may display first prompt information for indicating the target body part on the view image of a controlled virtual object, and a player may obtain corresponding virtual rewards by attacking the target position of a hostile virtual object to kill the hostile virtual object according to the first prompt information. When the virtual rewards accumulated by the team where the controlled virtual object is reach an upper limit, an indicator for indicating victory is displayed. The whole process improves the accuracy of the players' fight within additional rules, reduces additional computing processing, and saves resource consumption.

Figure 6:
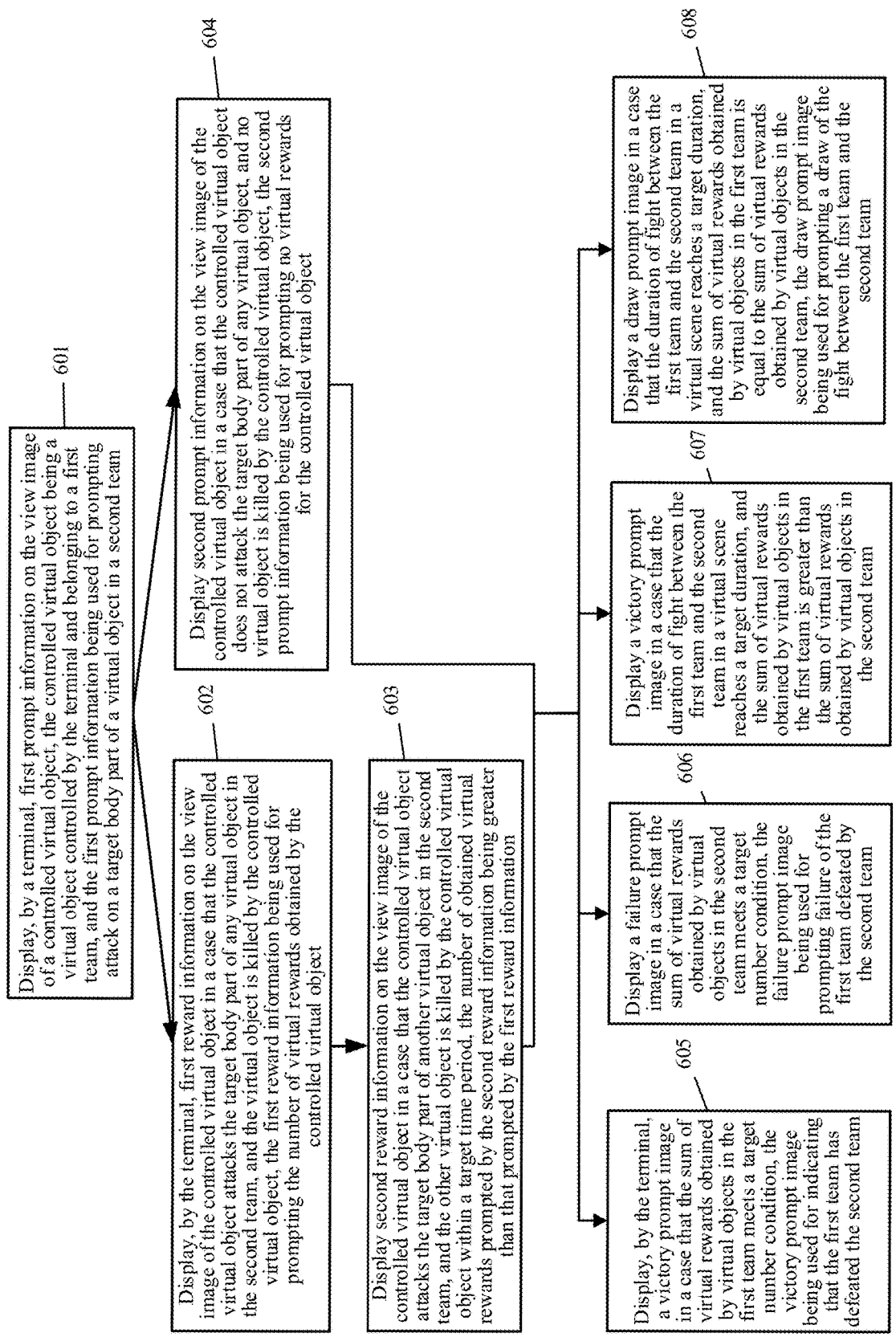
FIG. 6 is a flowchart of an example image display method provided by some embodiments of this application.

The steps 501-503 are brief descriptions of the embodiments of this application, and the technical solutions provided by the embodiments of this application will be described below with reference to some examples. FIG. 6 is a flowchart of an image display method provided by an embodiment of this application. Referring to FIG. 6, the method includes the following steps:

Step 601: Display, by a terminal, first prompt information on the view image of a controlled virtual object, the controlled virtual object being a virtual object controlled by the terminal and belonging to a first team, and the first prompt information being used for prompting attack on a target body part of a virtual object in a second team.

The first team and the second team are two teams in a hostile relationship, both the first team and the second team may include a plurality of virtual objects, and the virtual objects in the first team and the virtual objects in the second team may attack each other in a virtual scene. In some embodiments, the number of virtual objects in a first team is the same as that in a second team. In some embodiments, the number of virtual objects in a first team may be different from that in a second team.

In some examples, a terminal may display first prompt information in a text form on a view image of a controlled virtual object, and by reading the text, a player may learn the target body part of a virtual object in a second team to be attacked.

Figure 7:
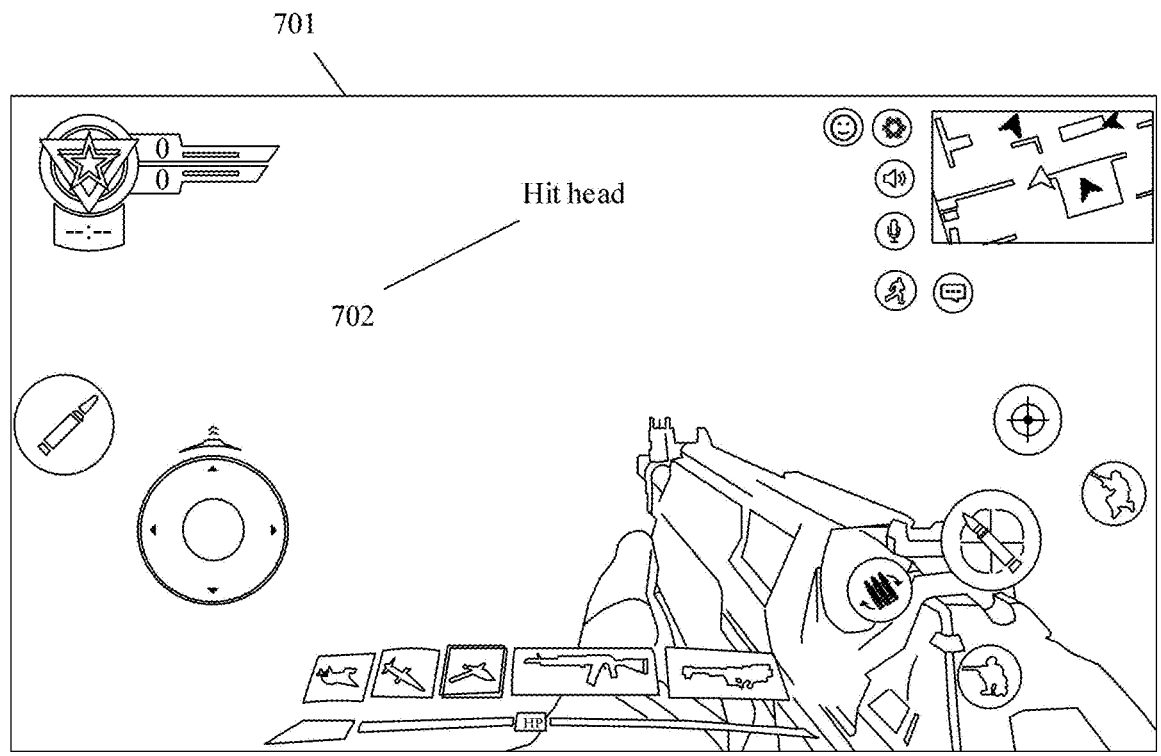
FIG. 7 is a schematic diagram of an example view image provided by some embodiments of this application.

For example, referring to FIG. 7, the terminal may display the first prompt information 702 at the top of the view image 701 of the controlled virtual object. In some embodiments, the first prompt information 702 is "Hit head". Of course, in addition to displaying the first prompt information 702 on the top of the view image 701, the terminal may also display the first prompt information 702 on other positions of the view image 701, e.g., the two sides or the bottom of the view image 701. The described examples should not be construed as limiting, as the first prompt information 702 may be displayed anywhere on the view image 701.

In some examples, a terminal may display first prompt information in a graphic form on the view image of a controlled virtual object, and by means of the first prompting information shown in the graphic form on the view image, a player may visually learn the target body part of a virtual object in the second team to be attacked.

Figure 8:
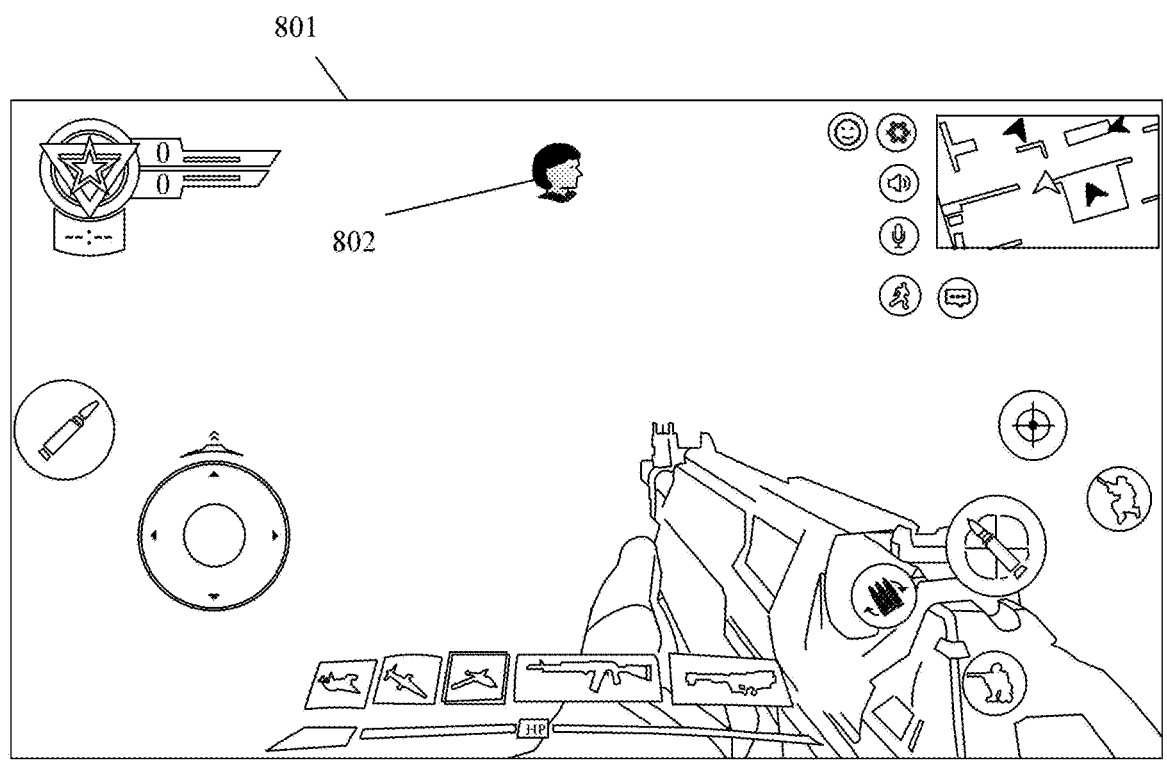
FIG. 8 is a schematic diagram of an example view image provided by some embodiments of this application.

For example, referring to FIG. 8, the terminal may display the first prompt information 802 at the top of the view image 801 of the controlled virtual object. In some embodiments, the first prompt information 802 is a graphic of a target body part, such as a graphic of a head. The graphic of a head indicates that the target body part of the virtual object in the second team to be attacked is the head. Of course, in addition to displaying the first prompt information 802 on the top of the view image 801 of the controlled virtual object, the terminal may also display the first prompt information 802 on other positions of the view image 801, e.g., the two sides or the bottom of the view image 801. The described examples should not be construed as limiting, as the first prompt information 802 may be displayed anywhere on the view image 801.

Figure 9:
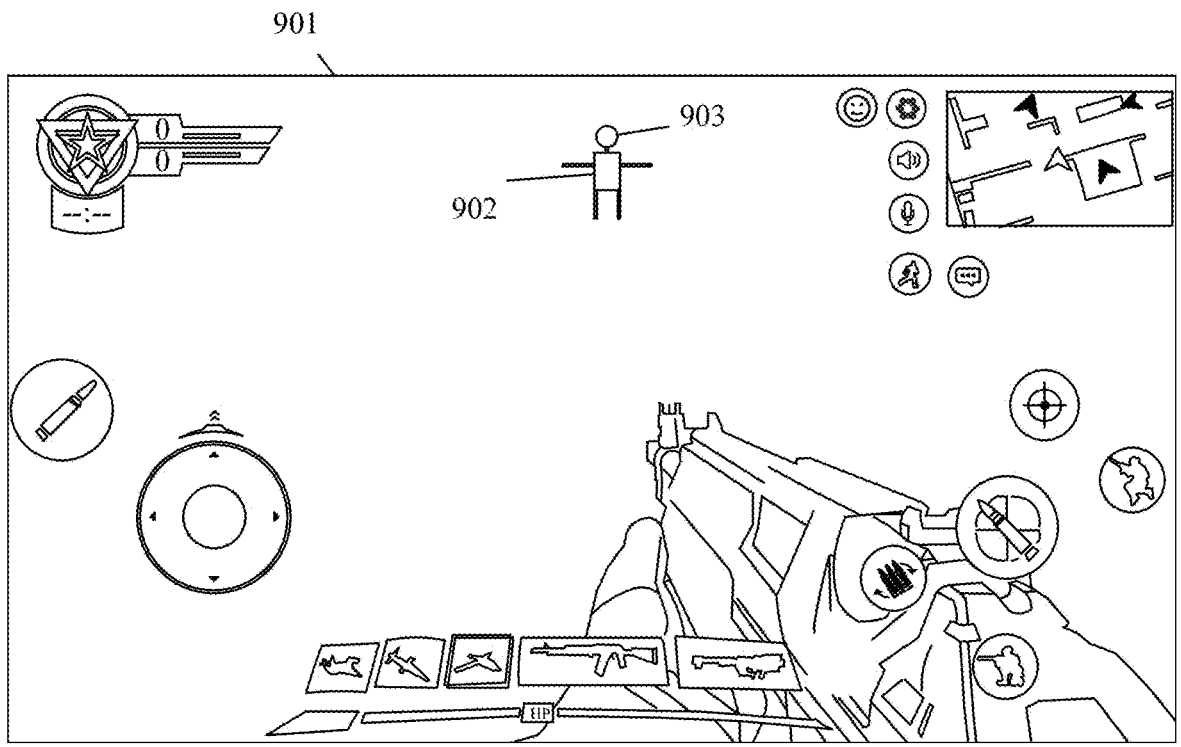
FIG. 9 is a schematic diagram of an example view image provided by some embodiments of this application.

In addition, referring to FIG. 9, the terminal may display a graphic 902 corresponding to the virtual object at the top of the view image 901 of the controlled virtual object, the graphic 902 including a plurality of body parts of the virtual object. The terminal may highlight the target body part 903 in the graphic 902, for example, increase the brightness value of the target body part 903, so that the target body part 903 may be significantly distinguished from other body parts in the graphic 902. Or, the terminal sets the color of the target body part 903 to an eye-catching color such as yellow or red, which may also distinguish the target body part 903 from other body parts in the graphic 902. In addition to displaying the graphic 902 on the top of the view image 901 of the controlled virtual object, the terminal may also display the graphic 902 on other positions of the view image 901, e.g., the two sides or the bottom of the view image 901. The described examples should not be construed as limiting, as the graphic 902 may be displayed anywhere on the view image 901. On this basis, in some examples, the terminal may set the graphic 902 to a translucent state, and set the target body part 903 to an opaque state, so that the parts other than the target body part 903 in the graphic 902 will not seriously block the view image 901, reducing the blind spot of a player in the game and improving the player's game experience.

In some examples, a terminal may display first prompt information in a form of text and graphics on the view image of a controlled virtual object, and by the combination of the two forms, a player may more clearly learn the target body part of a virtual object in the second team to be attacked.

Figure 10:
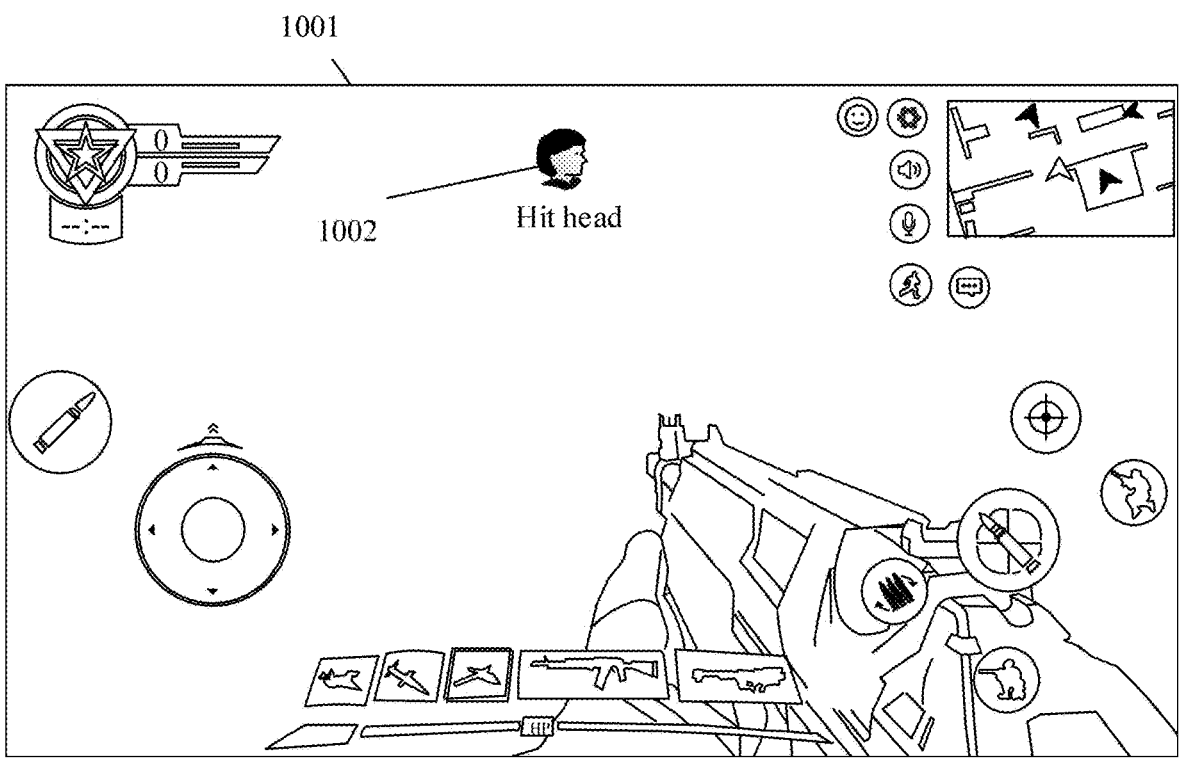
FIG. 10 is a schematic diagram of an example view image provided by some embodiments of this application.

For example, referring to FIG. 10, the terminal may display the first prompt information 1002 at the top of the view image 1001 of the controlled virtual object. In some embodiments, the first prompt information 1002 includes both a text "Hit head" and a graphic corresponding to the head. Of course, in addition to displaying the first prompt information 1002 on the top of the view image 1001 of the controlled virtual object, the terminal may also display the first prompt information 1002 on other positions of the view image 1001, e.g., the two sides or the bottom of the view image 1001. The described examples should not be construed as limiting, as the first prompt information 1002 may be displayed anywhere on the view image 1001.

In some embodiments, the terminal may also display the first prompt information in a highlighting manner, for example, the terminal highlights the head area of the virtual object as the first prompt information.

In some example, the terminal may prompt the player to attack the target body part of the virtual object in the second team by displaying the first prompt information on the view image of the controlled virtual object, and also play audio corresponding to the first prompt information while displaying the first prompt information. In some embodiments, if the first prompt information is "Hit head", the audio content corresponding to the first prompt information is "Hit head to kill enemy to get points", and the terminal may display "Hit head" while playing the audio "Hit head to kill enemy to get points". In this example, the terminal may more clearly remind the player to attack the target body part of the virtual object in the second team by displaying the first prompt information and playing the audio.

In some examples, the first prompt information may not only prompt attack on the target body part of the virtual object in the second team, but also prompt the pattern for attacking the target body part. In some embodiments, the attack pattern is the type of interactive prop for attacking the target body part. For example, the first prompt information is "Hit head with pistol", or "Hit head with knife", etc.

In this example, the terminal may provide players with more game modes, and the fight between players is more intense. For some players who want to improve their game level, such as players who want to practice a certain type of interactive props, they can easily practice, and the efficiency of human-computer interaction is high.

In some examples, after displaying the first prompt information and after a target duration, the terminal may update the first prompt information, and the target body part prompted by the updated first prompt information is different from that before the update. The specified duration may be set by game designers based on various factors and may be, for example, 2 minutes or 3 minutes. Players may also set the specified duration before the game starts.

In this example, the terminal may update the first prompt information every target duration, providing players with more game modes and improving the game experience and player stickiness.

Figure 11:
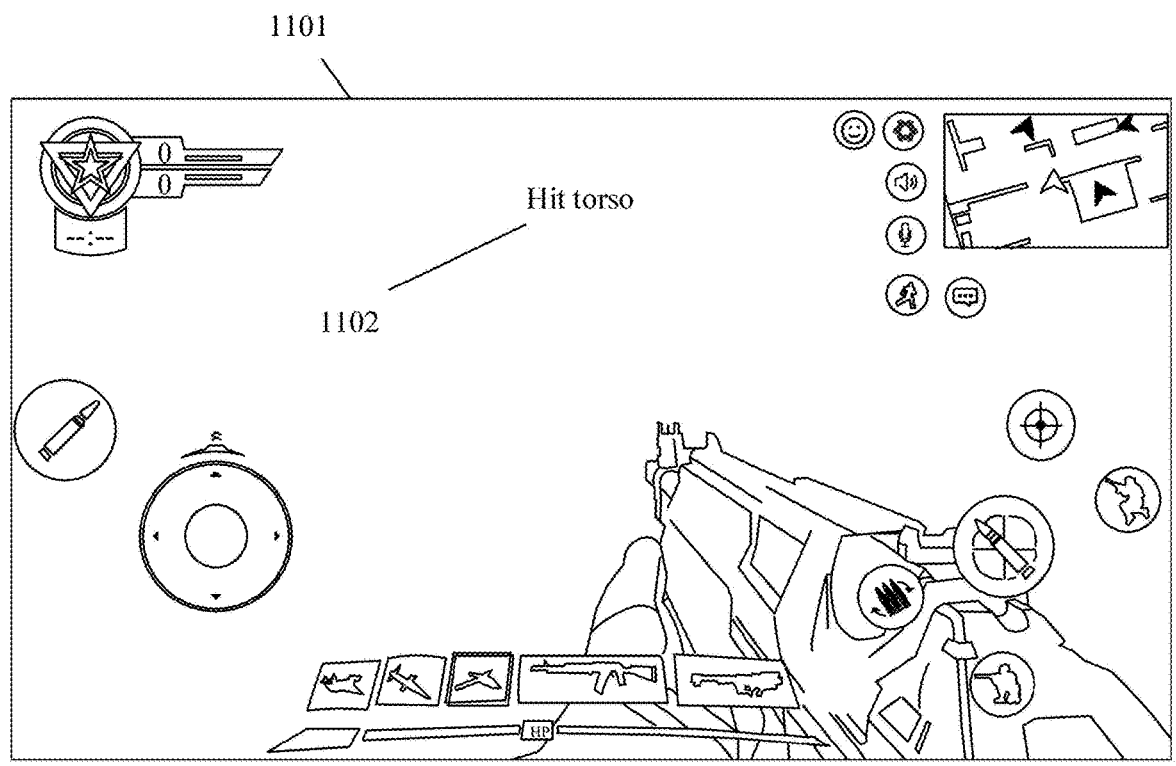
FIG. 11 is a schematic diagram of an example view image provided by some embodiments of this application.

For example, referring to FIG. 11, taking the target duration of 2 minutes as an example, the terminal may update the first prompt information 1102 displayed at the top of the view image 1101 of the controlled virtual object every 2 minutes. In some embodiments, after two minutes, the first prompt information 1102 is updated from "Hit head" to "Hit torso".

In some examples, after displaying the first prompt information, the terminal highlights the target body part of any virtual object in the view image when the virtual object in the second team enters the view image of the controlled virtual object.

In this example, the terminal may highlight the target body part of the hostile virtual object in the view image of the controlled virtual object while displaying the first prompt information, a player may directly attack the highlighted part of the hostile virtual object, and the efficiency of human-computer interaction is high.

In some examples, such an implementation may be applied to a novice tutorial of a game, and a novice player may quickly learn the gameplay of the game modes corresponding to the various embodiments of this application without the need for guidance from other players, increasing the efficiency of human-computer interaction.

Figure 12:
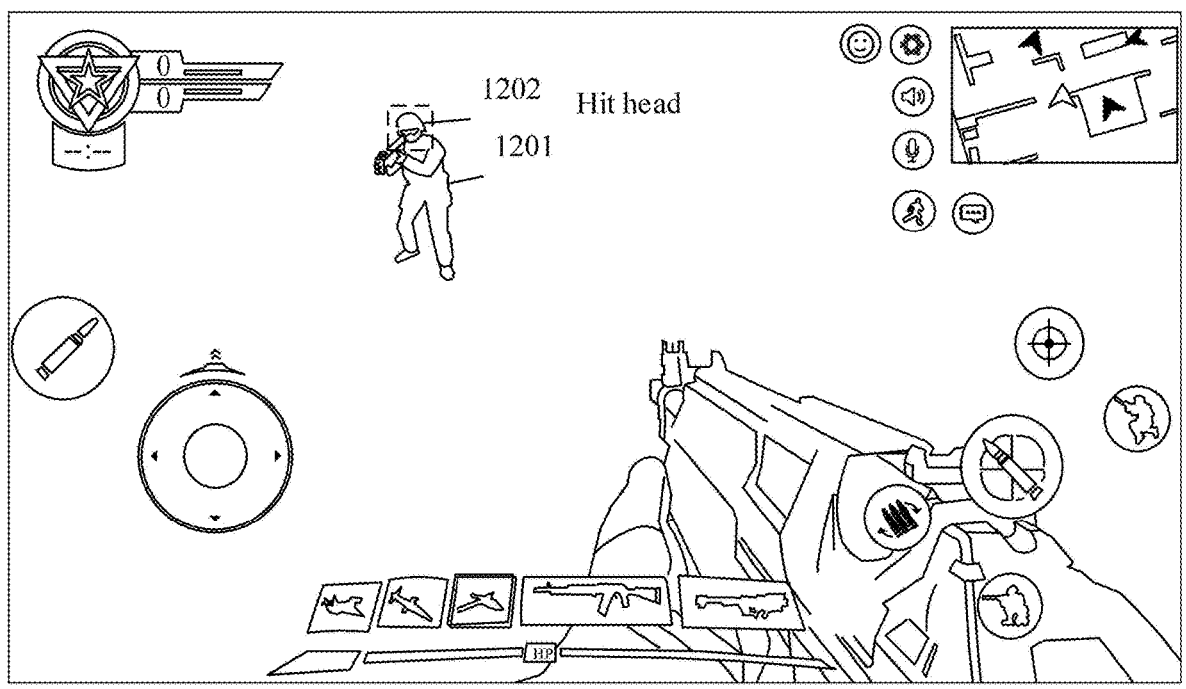
FIG. 12 is a schematic diagram of an example view image provided by some embodiments of this application.

For example, referring to FIG. 12, when the virtual object 1201 enters the view image of the controlled virtual object, the terminal may highlight the target body part 1202 of the virtual object 1201, for example, the target body part 1202 is highlighted in the form of a label box, or the display color of the target body part 1202 is changed. The described examples should not be construed as limiting, as the target body part 1202 may be indicated or highlighted in various manners.

In some examples, after step 601, the terminal may determine performance of the following step 602 or 604 according to the body part of the virtual object in the second team being attacked by the controlled virtual object.

Step 602: Display, by the terminal, first reward information on the view image of the controlled virtual object when the controlled virtual object attacks the target body part of any virtual object in the second team, and the virtual object is killed by the controlled virtual object, the first reward information being used for prompting the number of virtual rewards obtained by the controlled virtual object.

In the following description, a score as the virtual reward is taken as an example for description.

In some examples, the terminal displays the first reward information on the view image of the controlled virtual object when an interactive prop of the controlled virtual object projects, i.e., "shoots," virtual ammunition to the target body part of any virtual object, and the health value of the virtual object decreases to 0.

To describe the above examples more clearly, the following will be divided into two parts. The first part describes a method of the terminal determining that an interactive prop of the controlled virtual object projects virtual ammunition in the target body part of any virtual object, and the second part describes a method of the terminal for displaying the first reward information.

In the first part, in some examples, the terminal emits a detection ray starting from the interactive prop of the controlled virtual object in response to a virtual ammunition shooting instruction. The terminal determines that the interactive prop of the controlled virtual object shoots the virtual ammunition to the target body part of any virtual object when the detection ray is in contact with the target body part of the virtual object.

Figure 13:
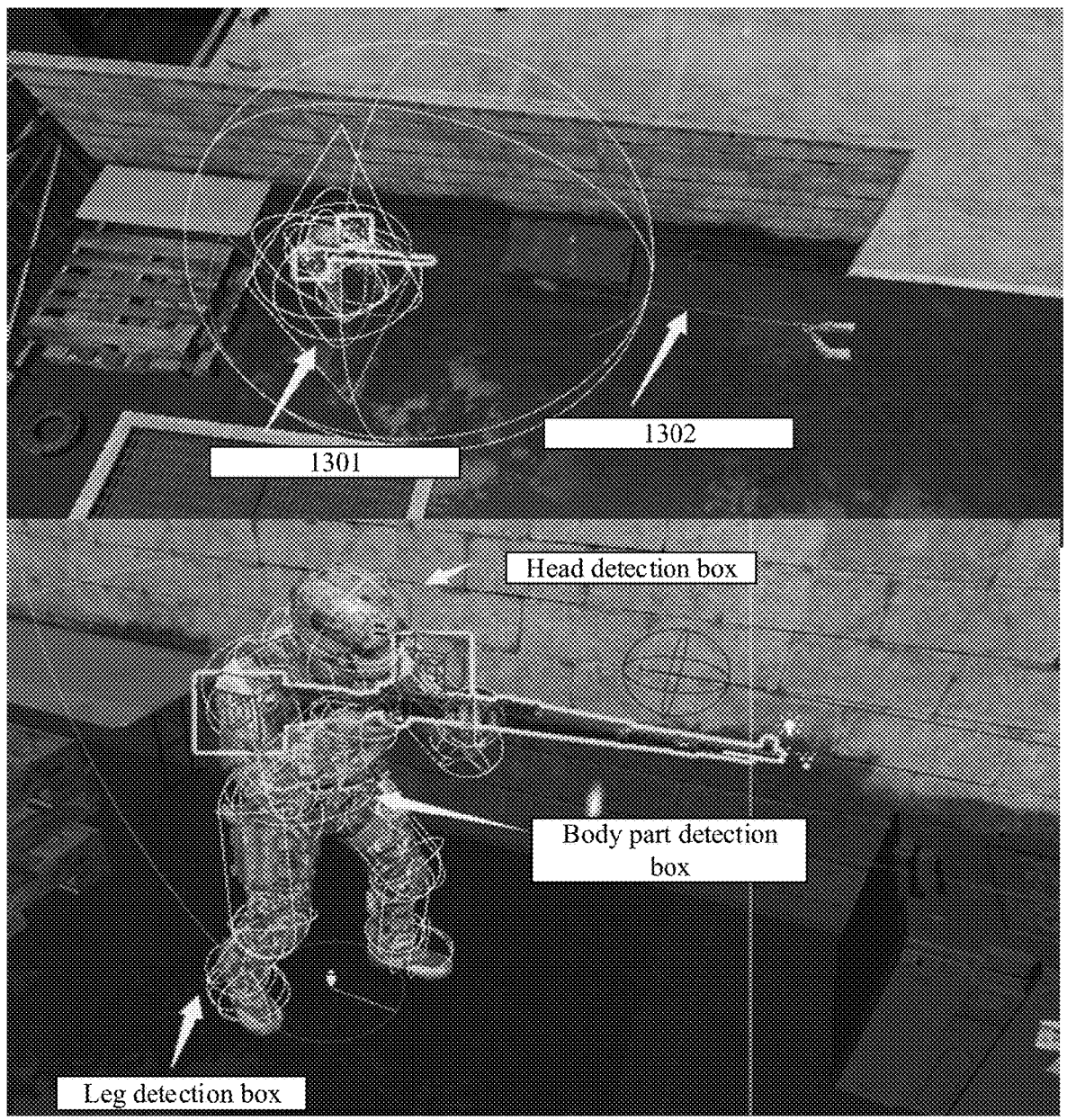
FIG. 13 is a schematic diagram of an example detection box and a detection ray provided by some embodiments of this application.

For example, referring to FIG. 13, each body part of a virtual object is provided with a plurality of invisible detection boxes 1301, and the interactive prop of the controlled virtual object may emit a detection ray 1302 starting from the interactive prop. The detection ray 1302 is also invisible, and a player may control the direction of the detection ray 1302 by controlling the orientation of the controlled virtual object. The terminal triggers a virtual ammunition shooting instruction in response to a player's virtual ammunition shooting operation, for example, a player taps the control 304 provided in FIG. 3. The terminal may determine whether the detection ray 1302 is in contact with a detection box 1301 on the virtual object in response to the virtual ammunition shooting instruction. The terminal determines that the virtual ammunition shot by the controlled virtual object hits the virtual object when the detection ray is in contact with any detection box 1301 on the virtual object. The terminal determines the remaining health value of the virtual object according to the type of virtual ammunition shot by the controlled virtual object and the health value of the virtual object. The type of virtual ammunition is used for indicating the number of health value the virtual ammunition may reduce. The terminal determines that the virtual object is killed when the number of the remaining health value of the virtual object is 0. The terminal performs the step of displaying first reward information when the terminal determines that the detection box 1301 in contact with the detection ray 1302 corresponds to the target body part.

In the second part, in some examples, the terminal may display the first reward information in a text form on the view image of the controlled virtual object, and a player may learn the points he/she has obtained by reading the text.

Figure 14:
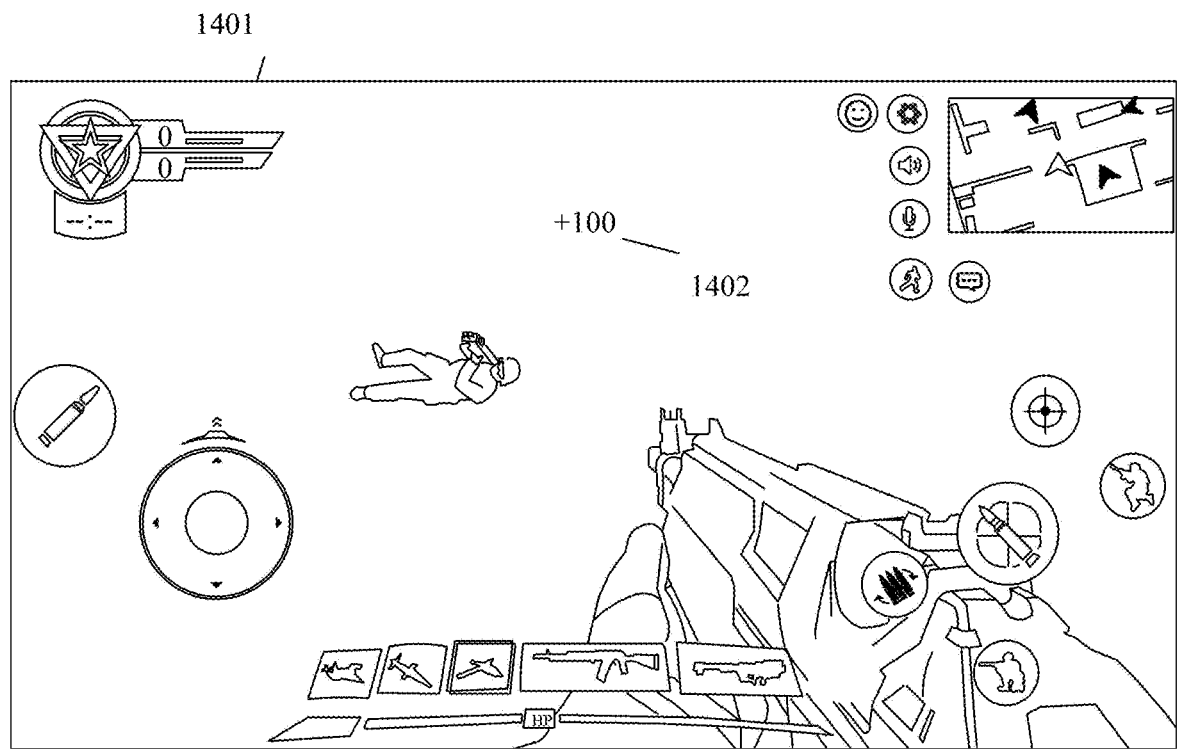
FIG. 14 is a schematic diagram of an example view image provided by some embodiments of this application.

For example, referring to FIG. 14, the terminal may display the first reward information 1402 at the top of the view image 1401 of the controlled virtual object. In some embodiments, the first reward information 1402 is "+100", which means that the controlled virtual object obtains 100 points. Of course, in addition to displaying the first reward information 1402 at the top of the view image 1401, the terminal may also display the first reward information 1402 on other positions of the view image 1401, e.g., the two sides or the bottom of the view image 1401. The described examples should not be construed as limiting, as the first reward information 1402 may be displayed anywhere on the view image 1401. In some embodiments, the terminal may display the first reward information 1402 above the killed virtual object, so as to more clearly indicate the location of the killed virtual object and the points obtained by the controlled virtual object. The display position of the first reward information is not limited in the embodiments of this application.

In addition, on the basis of the above examples, the terminal may also play the audio corresponding to the first reward information to remind a player of the points obtained by the controlled virtual object. In some embodiments, if the first reward information is "+100", the audio content corresponding to the first reward information is "You got 100 points for the team", and the terminal may play the audio "You got 100 points for the team" while displaying "+100". The terminal may more clearly remind the player of the points obtained by the controlled virtual object by displaying the first reward information and playing the audio. In some embodiments, the terminal may also display the first reward information in the form of images, videos, animations, etc.

Step 603: Display second reward information on the view image of the controlled virtual object when the controlled virtual object attacks the target body part of another virtual object in the second team, and the other virtual object is killed by the controlled virtual object within a target time period, the number of obtained virtual rewards prompted by the second reward information being greater than that prompted by the first reward information.

That is, if the terminal detects that the controlled virtual object kills another virtual object in the second team by attacking the target body part within a target time period, the controlled virtual object may get more points, and the terminal prompts the points obtained by the controlled virtual object through the second reward information. In some embodiments, this is also referred to as a "Kill Streak". The method of the terminal determining that the controlled virtual object kills another virtual object is similar to step 602.

Figure 15:
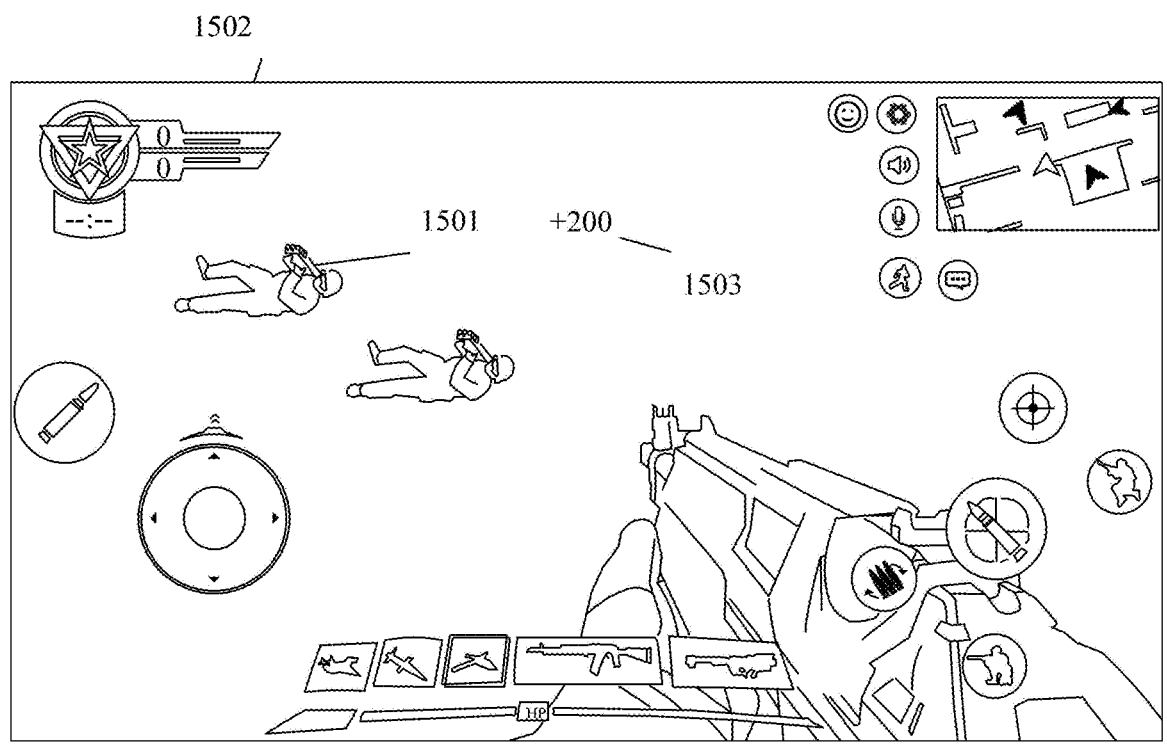
FIG. 15 is a schematic diagram of an example view image provided by some embodiments of this application.

For example, if the controlled virtual object kills a virtual object by attacking the target body part of the virtual object in the second team, the controlled virtual object may obtain 100 points. If the controlled virtual object kills another virtual object in the second team by attacking the target body part within a target time period, the controlled virtual object may obtain 200 points. Referring to FIG. 15, if the controlled virtual object kills another virtual object 1501 in the second team within a target time period, the terminal may display second reward information 1503 in a text form on the view image 1502 of the controlled virtual object, and a player may learn the points obtained by himself/herself by reading the text. Of course, in addition to displaying the second reward information 1503 at the top of the view image 1502, the terminal may also display the second reward information 1503 on other positions of the view image 1502, e.g., the two sides or the bottom of the view image 1502. The described examples should not be construed as limiting, as the second reward information 1503 may be displayed anywhere on the view image 1502. In some embodiments, the terminal may display the second reward information 1503 above the killed virtual object, so as to more clearly indicate the location of the killed virtual object and the points obtained by the controlled virtual object.

The relationship between the time when the controlled virtual object kills two virtual objects in the second team and the target time period is described below.

Figure 16:
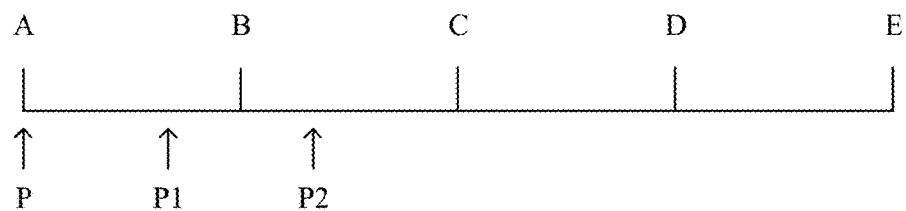
FIG. 16 is a schematic diagram of an example view image provided by some embodiments of this application.

Referring to FIG. 16, point P is the time point when the controlled virtual object kills a first virtual object in the second team, and AB, BC, CD and DE are a plurality of target time periods, AB=BC=CD=DE. If the controlled virtual object kills a second virtual object in the second team at the time point P1, the terminal may display the second reward information. If the controlled virtual object kills a second virtual object in the second team at the time point P2, the terminal will not display the second reward information, but the first reward information.

Step 603 is an optional step. In addition to performing step 603 after performing step 602, the terminal may also directly perform any one of steps 605-608 after performing step 602.

Step 604: Display second prompt information on the view image of the controlled virtual object when the controlled virtual object does not attack the target body part of any virtual object, and no virtual object is killed by the controlled virtual object, the second prompt information being used for prompting no virtual rewards for the controlled virtual object.

In some examples, the terminal displays the second prompt information on the view image of the controlled virtual object when an interactive prop of the controlled virtual object shoots virtual ammunition in a non-target body part of any virtual object, and the health value of the virtual object does not decrease.

The method of the terminal detecting the position of the virtual ammunition shot by the controlled virtual object to the virtual object is similar to step 602.

Figure 17:
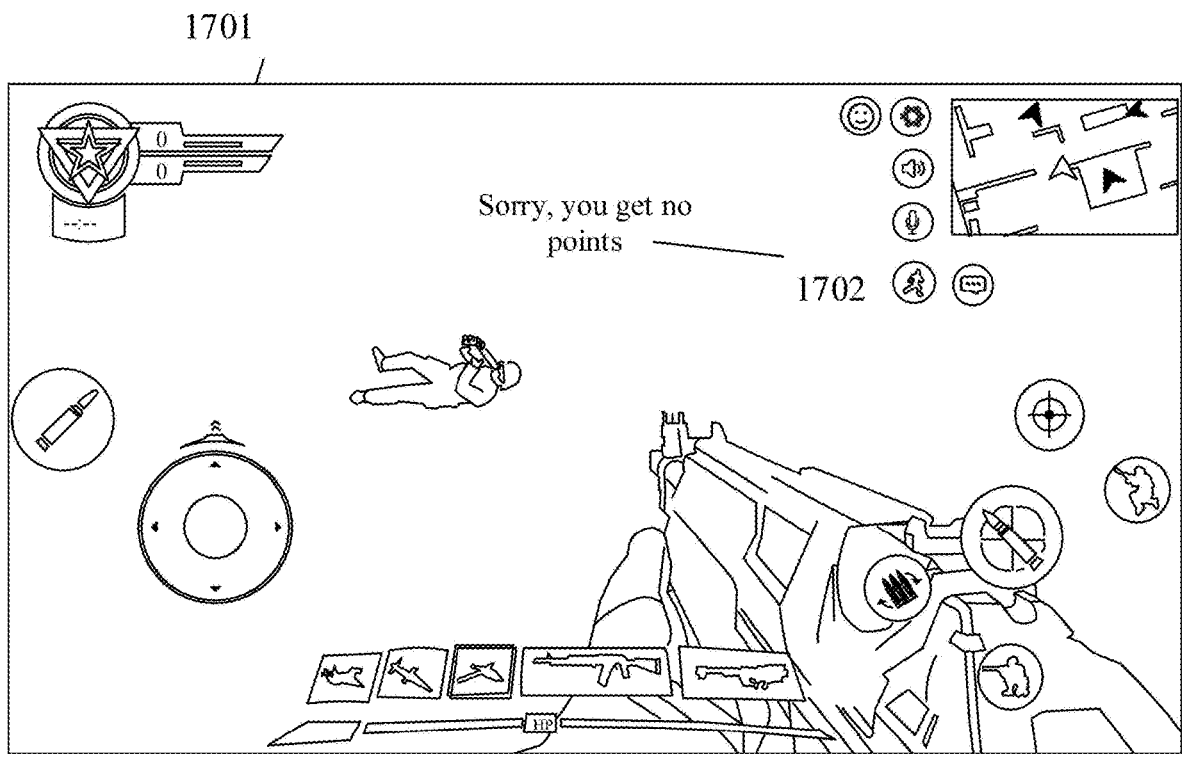
FIG. 17 is a schematic diagram of an example view image provided by some embodiments of this application.

For example, referring to FIG. 17, the terminal may display the second prompt information 1702 at the top of the view image 1701 of the controlled virtual object. In some embodiments, the second prompt information 1702 is "Sorry, you get no points", which means that the controlled virtual object did not get points. Of course, in addition to displaying the second prompt information 1702 on the top of the view image 1701, the terminal may also display the second prompt information 1702 on other positions of the view image 1701, e.g., the two sides or the bottom of the view image 1701. The described examples should not be construed as limiting, as the second prompt information 1702 may be displayed anywhere on the view image 1701. In some embodiments, the terminal may display the second prompt information 1702 above the killed virtual object.

In addition, in some examples, the terminal may also play the audio corresponding to the second prompt information to remind the player of the points obtained by the controlled virtual object. In some embodiments, if the second prompt information is "You get no points", the audio content corresponding to the second prompt information is "You get no points", and the terminal may display "You get no points" while playing the audio "You get no points". The terminal may more clearly remind the player of no points by displaying the second prompt information and playing the audio.

In addition, in some examples, the terminal may also remind the player that the controlled virtual object gets no points by means of vibration.

For example, the terminal transmits a vibration instruction to a vibration control device when an interactive prop of the controlled virtual object shoots virtual ammunition in a non-target body part of any virtual object, and the health value of the virtual object does not decrease. In response to the vibration instruction, the vibration control device vibrates, and in some embodiments, the vibration control device is a linear motor.

The terminal may perform any one of steps 605-608 after performing step 604.

Step 605: Display, by the terminal, a victory indicator when the sum of virtual rewards obtained by virtual objects in the first team meets a target number condition, the victory indicator being used for indicating that the first team has defeated the second team.

In some examples, the terminal may count the sums of points obtained by the virtual objects in the first team and the second team. If the sum of points obtained by the virtual objects in the first team is greater than or equal to a target sum of points, the terminal may display a victory indicator.

Figure 18:
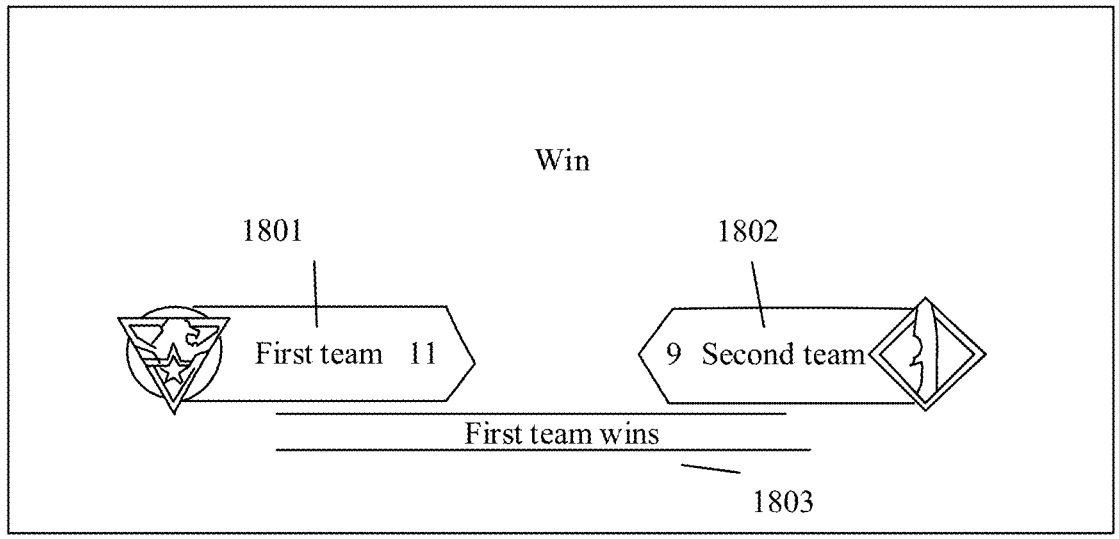
FIG. 18 is a schematic diagram of an example victory indicator provided by some embodiments of this application.

For example, the victory indicator is in a form shown in FIG. 18, the area 1801 and area 1802 respectively display the points obtained by the first team and the second team, and the area 1803 displays the prompt of victory of the first team.

Of course, step 605 is described by taking the terminal counting the sums of points obtained by the virtual objects in the first team and the second team as an example. In other examples, a server may also count the sums of points obtained by the virtual objects in the first team and the second team.

Step 606: Display a defeat indicator when the sum of virtual rewards obtained by virtual objects in the second team meets a target number condition, the defeat indicator being used for indicating defeat of the first team by the second team.

In some examples, the terminal may count the sums of points obtained by the virtual objects in the first team and the second team. If the sum of points obtained by the virtual objects in the second team is greater than or equal to a target sum of points, the terminal may display a defeat indicator.

Figure 19:
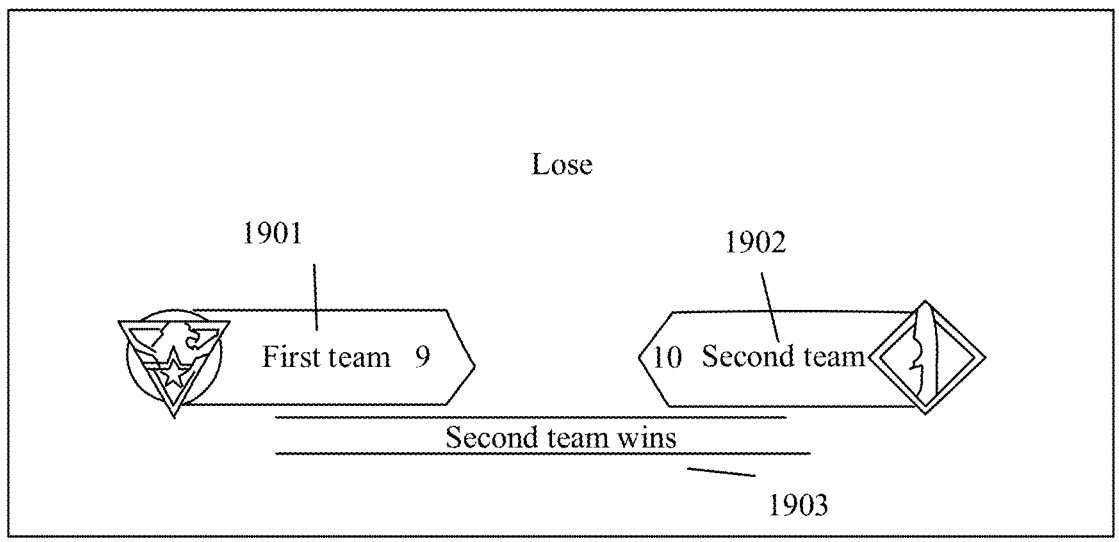
FIG. 19 is a schematic diagram of an example defeat indicator provided by some embodiments of this application.

For example, the defeat indicator is in a form shown in FIG. 19, the area 1901 and area 1902 respectively display the points obtained by the first team and the second team, and the area 1903 displays the prompt of victory of the second team.

Of course, step 606 is described by taking the terminal counting the sums of points obtained by the virtual objects in the first team and the second team as an example. In other examples, a server may also count the sums of points obtained by the virtual objects in the first team and the second team.

Step 607: Display an indicator when the duration of fight between the first team and the second team in a virtual scene reaches a target duration, and the sum of virtual rewards obtained by virtual objects in the first team is greater than the sum of virtual rewards obtained by virtual objects in the second team.

In some examples, the terminal may count the duration of fight between the first team and the second team in a virtual scene, and may also count the sums of points obtained by the virtual objects in the first team and the second team. If the duration of fight between the first team and the second team in a virtual scene is equal to a target duration, and the sum of points obtained by the virtual objects in the first team is greater than the sum of points obtained by the virtual objects in the second team, the terminal may display a victory indicator.

Figure 20:
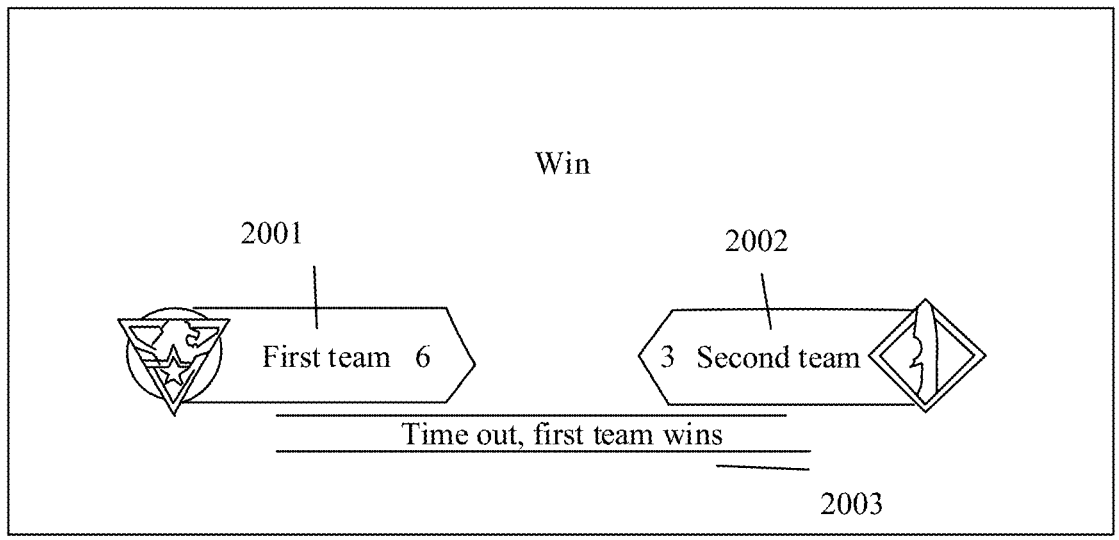
FIG. 20 is a schematic diagram of an example victory indicator provided by some embodiments of this application.

For example, the victory indicator is in a form shown in FIG. 20, the area 2001 and area 2002 respectively display the points obtained by the first team and the second team, and the area 2003 displays the prompt of victory of the first team.

Of course, step 605 is described by taking the terminal counting the sums of points obtained by the virtual objects in the first team and the second team as an example. In other examples, a server may also count the sums of points obtained by the virtual objects in the first team and the second team.

Step 608: Display a draw indicator when the duration of fight between the first team and the second team in a virtual scene reaches a target duration, and the sum of virtual rewards obtained by virtual objects in the first team is equal to the sum of virtual rewards obtained by virtual objects in the second team, the draw indicator being used for prompting a draw of the fight between the first team and the second team.

In some examples, the terminal may count the duration of fight between the first team and the second team in a virtual scene, and may also count the sums of points obtained by the virtual objects in the first team and the second team. If the duration of fight between the first team and the second team in a virtual scene is equal to a target duration, and the sum of points obtained by the virtual objects in the first team is equal to the sum of points obtained by the virtual objects in the second team, the terminal may display a draw indicator.

Figure 21:
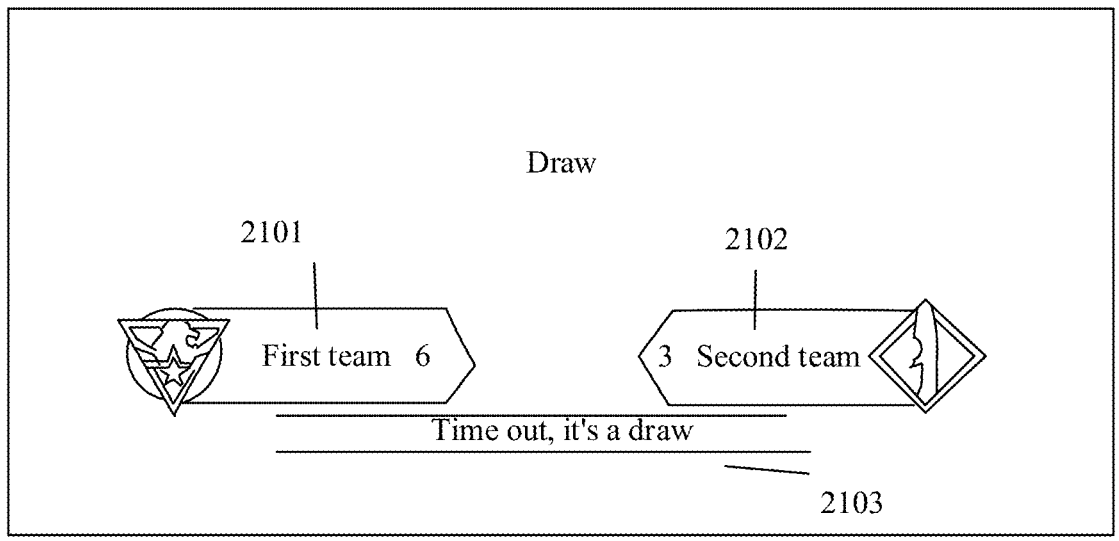
FIG. 21 is a schematic diagram of an example draw indicator provided by some embodiments of this application.

For example, the draw indicator is in a form shown in FIG. 21, the area 2101 and area 2102 respectively display the points obtained by the first team and the second team, and the area 2103 displays the prompt of a draw between the first team and the second team.

Of course, step 605 is described by taking the terminal counting the sums of points obtained by the virtual objects in the first team and the second team as an example. In other examples, a server may also count the sums of points obtained by the virtual objects in the first team and the second team.

The described embodiments may be combined in various manners to form additional embodiments of this disclosure.

Figure 22:
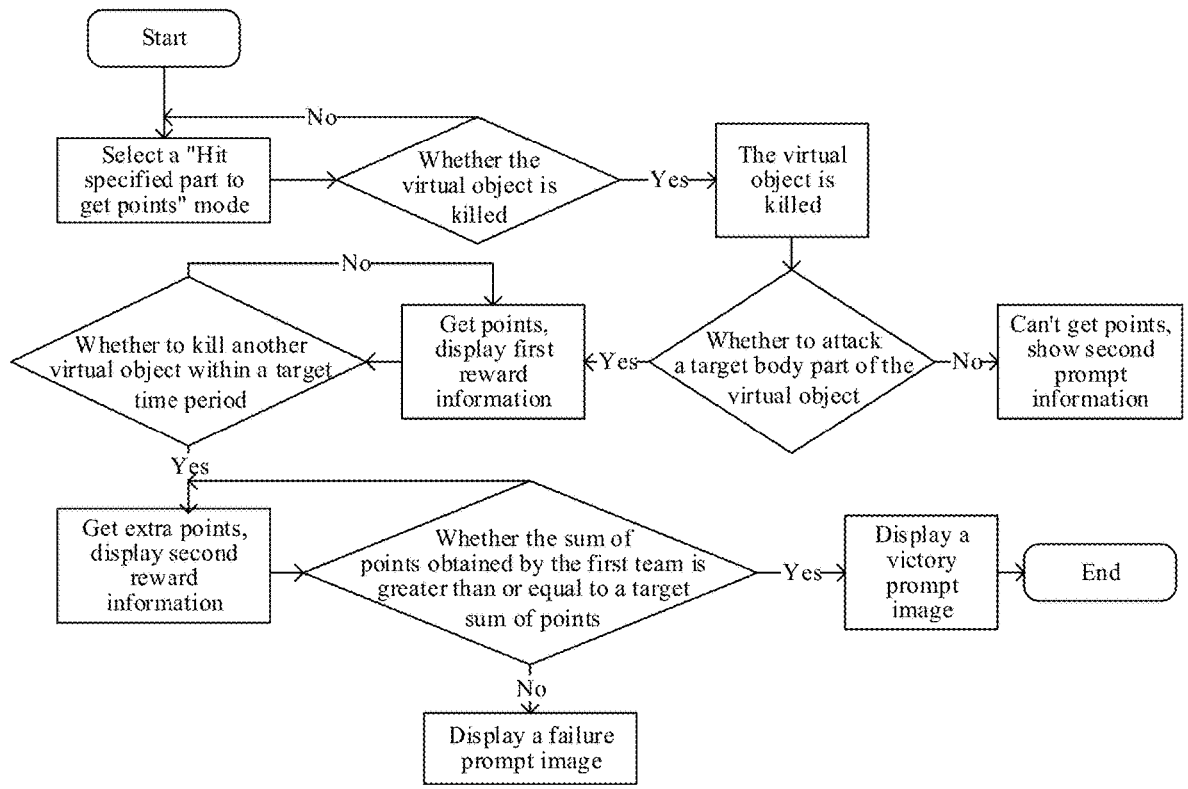
FIG. 22 is a logical block diagram of an example image display method provided by some embodiments of this application.

The technical solutions provided by the embodiments of this application will be described below with reference to FIG. 22 and optional steps and drawings involved in the above description process:

Referring to FIG. 4, when the game starts, a player may select a game mode corresponding to the technical solution provided by the embodiments of this application on a game mode selection interface 401. In some embodiments, this game mode may be referred to as a "Hit specified part to get points" mode. After selecting the game mode, a player may control a controlled virtual object to fight against virtual objects in a second team in a virtual scene. The controlled virtual object may kill the virtual objects in the second team, and the virtual objects in the second team may kill the controlled virtual object. Referring to FIG. 10, during the game, the terminal displays first prompt information 1002 on a view image 1001 of the controlled virtual object. When the controlled virtual object kills any virtual object in the second team, the terminal determines whether the controlled virtual object attacks a target body part of the virtual object. If the terminal determines that the controlled virtual object attacks the target body part of the virtual object, the terminal may increase the score of the controlled virtual object and simultaneously displays first reward information 1402 as shown in FIG. 14. If the terminal determines that the controlled virtual object does not attack the target body part of the virtual object, the terminal does not increase the score of the controlled virtual object and simultaneously displays second prompt information 1702 as shown in FIG. 17. If after the first prompt information is displayed, the controlled virtual object kills another virtual object in the second team by attacking the target body part within a target time period, the terminal may add extra points for the controlled virtual object, and simultaneously displays second reward information 1503 as shown in FIG. 15. When the sum of points obtained by the first team where the controlled virtual object is greater than or equal to a target sum of points, the terminal may display a victory indicator as shown in FIG. 18.

By the technical solutions provided by the embodiments of this application, during a game, a terminal may display first prompt information for indicating the target body part on the view image of a controlled virtual object, and a player may obtain corresponding virtual rewards by attacking the target position of a hostile virtual object to kill the hostile virtual object according to the first prompt information. When the virtual rewards accumulated by the team where the controlled virtual object is reach an upper limit, a victory indicator for indicating victory may be displayed. The whole process does not require human intervention or judgment of a referee, and the terminal may automatically determine whether a player abides by the rules and record the score, improving the efficiency of human-computer interaction.

Figure 23:
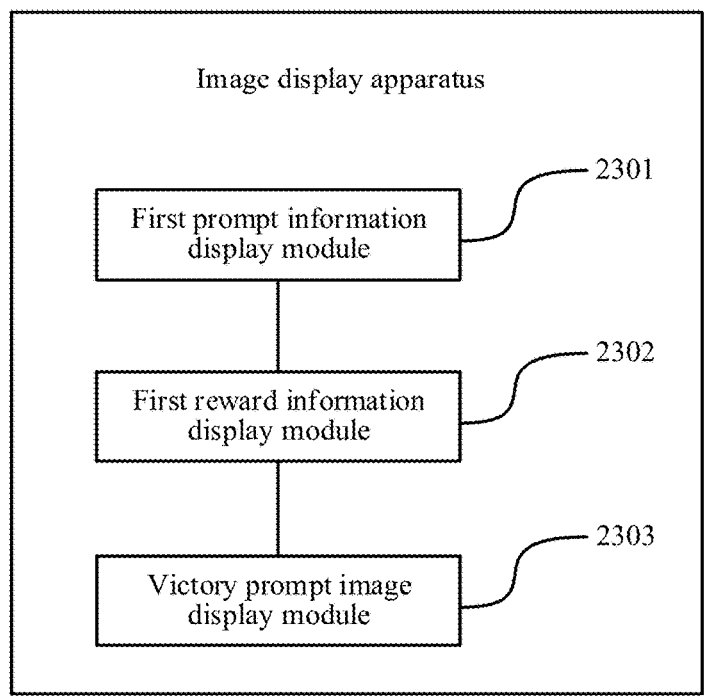
FIG. 23 is a schematic structural diagram of an example image display apparatus provided by some embodiments of this application.

FIG. 23 is a schematic structural diagram of an image display apparatus provided by an embodiment of this application. Referring to FIG. 23, the apparatus includes: a first prompt information display module 2301, a first reward information display module 2302 and an indicator display module 2303.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The first prompt information display module 2301 is configured to display first prompt information on the view image of a controlled virtual object, the controlled virtual object being a virtual object controlled by a terminal and belonging to a first team, and the first prompt information being used for prompting attack on a target body part of a virtual object in a second team.

The first reward information display module 2302 is configured to display first reward information on the view image of the controlled virtual object when the controlled virtual object attacks the target body part of any virtual object in the second team, and the virtual object is killed by the controlled virtual object, the first reward information being used for prompting the number of virtual rewards obtained by the controlled virtual object.

The indicator display module 2303 is configured to display an indicator when the sum of virtual rewards obtained by virtual objects in the first team meets a target number condition.

In some examples, the first reward information display module is configured to display first reward information on the view image of the controlled virtual object when an interactive prop of the controlled virtual object shoots virtual ammunition in the target body part of any virtual object, and the health value of the virtual object decrease to 0.

In some examples, the apparatus further includes:
a detection ray emitting module, configured to emit a detection ray starting from the interactive prop of the controlled virtual object in response to a virtual ammunition shooting instruction; and
a determining module, configured to determine that the interactive prop of the controlled virtual object shoots the virtual ammunition in the target body part of any virtual object when the detection ray is in contact with the target body part of the virtual object.

In some examples, the apparatus further includes:
a second prompt information display module, configured to display second prompt information on the view image of the controlled virtual object when the controlled virtual object does not attack the target body part of any virtual object, and no virtual object is killed by the controlled virtual object, the second prompt information being used for prompting no virtual rewards for the controlled virtual object.

In some examples, the apparatus further includes:
an updating module, configured to update the first prompt information after a target duration, the target body part prompted by the updated first prompt information being different from that before the update.

In some examples, the apparatus further includes:
a second reward information display module, configured to display second reward information on the view image of the controlled virtual object when the controlled virtual object attacks the target body part of another virtual object in the second team, and the other virtual object is killed by the controlled virtual object within a target time period, the number of obtained virtual rewards prompted by the second reward information being greater than that prompted by the first reward information.

In some examples, the apparatus further includes:
a defeat indicator display module, configured to display a defeat indicator when the sum of virtual rewards obtained by virtual objects in the second team meets a target number condition, the defeat indicator being used for indicating the first team defeated by the second team.

In some examples, the indicator display module is further configured to display an indicator when the duration of fight between the first team and the second team in a virtual scene reaches a target duration, and the sum of virtual rewards obtained by virtual objects in the first team is greater than the sum of virtual rewards obtained by virtual objects in the second team.

In some examples, the apparatus further includes:
a draw indicator display module, configured to display a draw indicator when the duration of fight between the first team and the second team in a virtual scene reaches a target duration, and the sum of virtual rewards obtained by virtual objects in the first team is equal to the sum of virtual rewards obtained by virtual objects in the second team, the draw indicator being used for prompting a draw of the fight between the first team and the second team.

In some examples, the apparatus further includes:

a highlighting module, configured to highlight the target body part of any virtual object on the view image when the virtual object in the second team enters the view image of the controlled virtual object.

When the image display apparatus provided in the foregoing embodiments displays an image, the division of the foregoing functional modules is merely used as an example for description. In actual applications, the foregoing functions may be allocated to different functional modules. That is, an inner structure of the computer device is divided into different functional modules to complete all or some of the functions described above. In addition, the image display apparatus and method embodiments provided in the foregoing embodiments belong to the same conception. For example implementations, reference may be made to the method embodiments described herein.

By the technical solutions provided by the embodiments of this application, during a game, a terminal may display first prompt information for indicating the target body part on the view image of a controlled virtual object, and a player may obtain corresponding virtual rewards by attacking the target position of a hostile virtual object to kill the hostile virtual object according to the first prompt information. When the virtual rewards accumulated by the team where the controlled virtual object is reach an upper limit, an indicator for indicating victory may be displayed. The whole process does not require human intervention or judgment of a referee, and the terminal may automatically determine whether a player abides by the rules and record the score, improving the efficiency of human-computer interaction.

Figure 24:
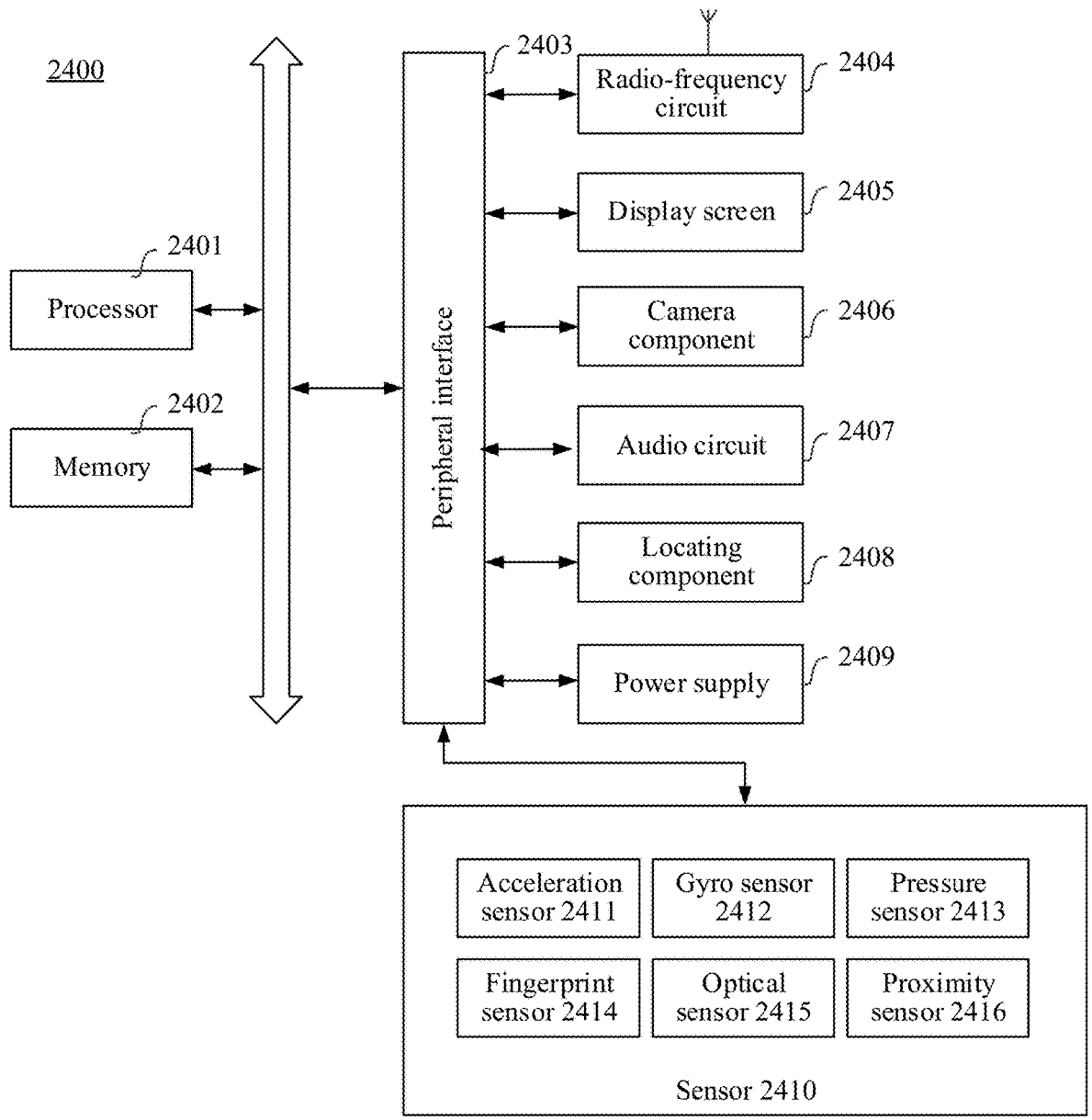
FIG. 24 is a schematic structural diagram of an example terminal according to some embodiments of this application.

The embodiments of this application provide a computer device for executing the above method. The computer device may be implemented as a terminal or a server. The structure of the terminal is first introduced below:

FIG. 24 is a schematic structural diagram of a terminal according to an embodiment of this application. The terminal 2400 may be a smartphone, a tablet computer, a notebook computer, or a desktop computer. The terminal 2400 may also be referred to as another name such as user equipment, a portable terminal, a laptop terminal, or a desktop terminal.

Generally, the terminal 2400 includes: one or more processors 2401 and one or more memories 2402.

The processor 2401 may include one or more processing cores, and may be, for example, a 4-core processor or an 8-core processor. The processor 2401 may be implemented in at least one hardware form of DSP, FPGA, and PLA. The processor 2401 may also include a main processor and a coprocessor. The main processor is a processor configured to process data in an active state, also referred to as a central processing unit (CPU). the coprocessor is a low-power processor configured to process data in a standby state. In some embodiments, the processor 2401 may be integrated with a GPU. The GPU is configured to be responsible for rendering and drawing content for a display. In some embodiments, the processor 2401 may further include an AI processor. The AI processor is configured to process a computing operation related to machine learning.

The memory 2402 may include one or more non-transitory computer-readable storage media that may be non-transitory. The memory 2402 may further include a high-speed random access memory and a non-volatile memory, for example, one or more disk storage devices or flash storage devices. In some embodiments, the non-transitory computer-readable storage medium in the memory 2402 is configured to store at least one computer program, and the at least one computer program is configured to be executed by the processor 2401 to implement the image display method provided in the method embodiments of this application.

A person skilled in the art will understand that the structure shown as terminal 2400 in FIG. 24 is merely an example of a terminal, and the terminal may include more or fewer components than those shown in the figure, or some components may be combined, or a different component deployment may be used.

Figure 25:
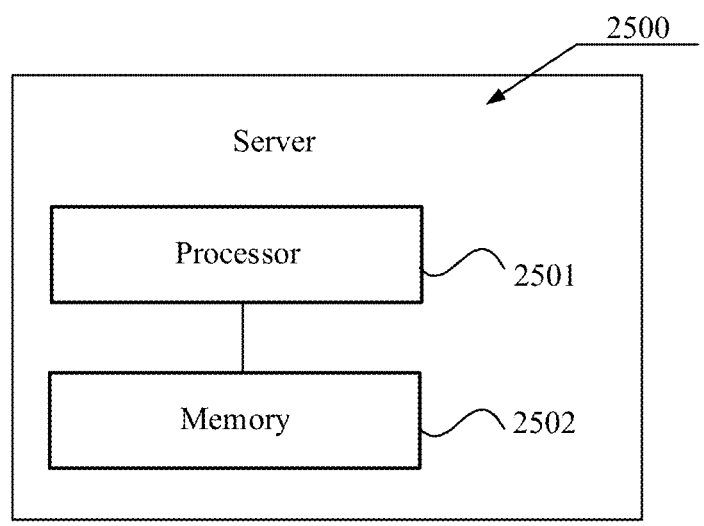
FIG. 25 is a schematic structural diagram of an example server according to some embodiments of this application.

The computer device may also be implemented as a server, and the following describes a structure of the server:

FIG. 25 is a schematic structural diagram of a server according to an embodiment of this application. The server 2500 may vary greatly because a configuration or performance varies, and may include one or more central processing units (CPU) 2501 and one or more memories 2502. The one or more memories 2502 store at least one computer program, and the at least one computer program is loaded and executed by the one or more processors 2501 to implement the methods provided in the foregoing various method embodiments. The server 2500 may also have a wired or wireless network interface, a keyboard, an input/output interface and other components to facilitate input/output. The server 2500 may also include other components for implementing device functions.

In an example embodiment, a non-transitory computer-readable storage medium, such as a memory including a computer program, is further provided, and the computer program may be executed by a processor to complete the image display method in the foregoing embodiments. For example, the non-transitory computer-readable storage medium may be a read-only memory (ROM), a random access memory (random-access memory, RAM), a compact disc read-only memory (CD-ROM), a magnetic tape, a floppy disk, an optical data storage device, and the like.

In an example embodiment, a computer program product or a computer program is further provided, the computer program product or the computer program including program code, the program code being stored in a non-transitory computer-readable storage medium, a processor of a computer device reading the program code from the non-transitory computer-readable storage medium and the processor executing the program code to cause the computer device to perform the foregoing image display method.

A person of ordinary skill in the art may understand that all or some of the steps of the foregoing embodiments may be implemented by hardware, or may be implemented a program instructing related hardware. The program may be stored in a non-transitory computer-readable storage medium. The storage medium may be: a ROM, a magnetic disk, or an optical disc.

The foregoing descriptions are merely example embodiments of this application. Any combination, modification, equivalent replacement within the spirit and principle of this application shall fall within the protection scope of this disclosure.

What is claimed is:

1. An image display method, comprising:
  displaying a visual image of a controlled virtual object on a display screen, the controlled virtual object belonging to a first team;
  displaying prompt information indicating a target body part of a target virtual object belonging to a second team, wherein the prompt information indicates a reward condition obtainable through an attack of the target body part of the target virtual object by the controlled virtual object;

emitting, in response to a virtual shooting instruction, a detection ray from a virtual weapon equipped by the controlled virtual object, wherein the detection ray is not visible on the display screen;

determining, for a target duration since the prompt information was first displayed, whether the attack of the controlled virtual object targets the target body part of the virtual object such that it meets a reward condition by detecting whether the detection ray is in contact with a detection box on the virtual object, wherein the detection box corresponds to the target body part and the detection box is not visible on the display screen;

providing a first reward to the first team when the reward condition is met;

dynamically updating and displaying updated prompt information after the target duration has elapsed to indicate an updated target body part of the target virtual object, the updated prompt information being different from the prompt information before the update.

2. The method according to claim 1, wherein the first team does not receive the first reward when the reward condition is not met.

3. The method according to claim 2, further comprising: determining whether the reward condition is met, both causing damage to the target virtual object.

4. The method according to claim 1, wherein the reward condition comprises that the attacked body part is a target body part.

5. The method according to claim 4, wherein the reward condition further comprises that the attack kills the target virtual object.

6. The method according to claim 1, wherein the weapon is a weapon of ammunition.

7. The method according to claim 1, wherein the prompt information comprises at least one of:
a text specifying the target body part; or
a highlight on the target body part of the target virtual object.

8. The method according to claim 1, further comprising: providing a second reward to the first team larger than the first reward when the reward condition is met twice within a preset time interval.

9. The method according to claim 1, further comprising: determining the first team defeats the second team when a total reward obtained by the first team is at or above a target threshold.

10. The method according to claim 1, further comprising: determining the first team defeats the second team when a fight duration between the first team and the second team reaches a length duration and a total reward obtained by the first team is greater than a total reward obtained by the second team.

11. The method according to claim 1, further comprising: highlighting the target body part of the target virtual object when the virtual object enters a viewing image of the controlled virtual object.

12. The method according to claim 1, wherein the prompt information comprises a graphic comprising a depiction of the target body part, wherein the depiction of the target body part is displayed in an opaque manner and a remaining portion of the graphic is displayed in a translucent manner.

13. An electronic device comprising at least one processor and at least one memory, the at least one memory storing computer-readable instructions, the computer-readable instructions, when executed by the at least one processor, causing the at least one processor to:

displaying a visual image of a controlled virtual object on a display screen, the controlled virtual object belonging to a first team;

displaying prompt information indicating a target body part of a target virtual object belonging to a second team, wherein the prompt information indicates a reward condition obtainable through an attack of the target body part of the target virtual object by the controlled virtual object;

emitting, in response to a virtual shooting instruction, a detection ray from a virtual weapon equipped by the controlled virtual object, wherein the detection ray is not visible on the display screen;

determining, for a target duration since the prompt information was first displayed, whether the attack of the controlled virtual object targets the target body part of the virtual object such that it meets a reward condition by detecting whether the detection ray is in contact with a detection box on the virtual object, wherein the detection box corresponds to the target body part and the detection box is not visible on the display screen;

providing a first reward to the first team when the reward condition is met;

dynamically updating and displaying updated prompt information after the target duration has elapsed to indicate an updated target body part of the target virtual object, the updated prompt information being different from the prompt information before the update.

14. The electronic device according to claim 13, wherein the first team does not receive the first reward when the reward condition is not met.

15. The electronic device according to claim 13, wherein the reward condition comprises that the attacked body part is a target body part.

16. The electronic device according to claim 15, wherein the reward condition further comprises that the attack kills the target virtual object.

17. The electronic device according to claim 13, wherein the prompt information comprises at least one of
a text specifying the target body part; or
a highlight on the target body part of the target virtual object.

18. The electronic device according to claim 13, the computer-readable instructions, when executed by the at least one processor, causing the at least one processor to further:
determining the first team defeats the second team when a total reward obtained by the first team is at or above a target threshold.

19. The electronic device according to claim 13, the computer-readable instructions, when executed by the at least one processor, causing the at least one processor to further:
determining the first team defeats the second team when a fight duration between the first team and the second team reaches a length duration and a total reward obtained by the first team is greater than a total reward obtained by the second team.

20. A non-transitory computer-readable storage medium storing at least one instruction, at least one program, a code set, or an instruction set, the at least one instruction, the at least one program, the code set, or the instruction set being loaded and executed by at least one processor, causing the at least one processor to perform an image display method comprising:
- displaying a visual image of a controlled virtual object on a display screen, the controlled virtual object belonging to a first team;
- displaying prompt information indicating a target body part of a target virtual object belonging to a second team, wherein the prompt information indicates a reward condition obtainable through an attack of the target body part of the target virtual object by the controlled virtual object;
- emitting, in response to a virtual shooting instruction, a detection ray from a virtual weapon equipped by the controlled virtual object, wherein the detection ray is not visible on the display screen;
- determining, for a target duration since the prompt information was first displayed, whether the attack of the controlled virtual object targets the target body part of the virtual object such that it meets a reward condition by detecting whether the detection ray is in contact with a detection box on the virtual object, wherein the detection box corresponds to the target body part and the detection box is not visible on the display screen;
- providing a first reward to the first team when the reward condition is met;
- dynamically updating and displaying updated prompt information after the target duration has elapsed to indicate an updated target body part of the target virtual object, the updated prompt information being different from the prompt information before the update.

* * * * *